Figure 1:
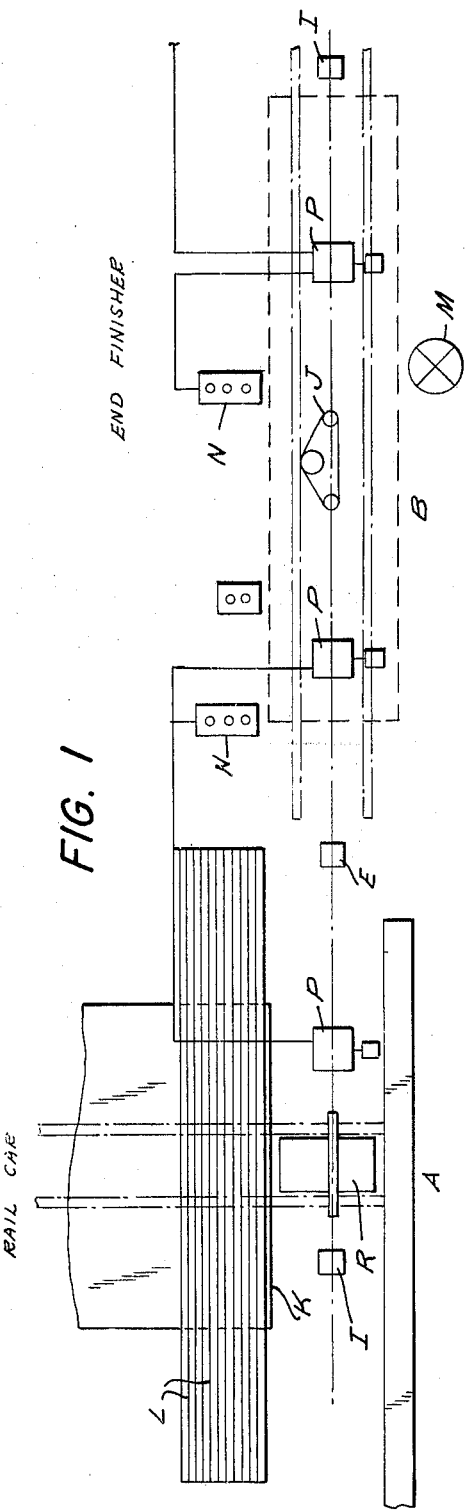

Oct. 19, 1965   R. H. BENNEWITZ ETAL   3,212,184
RAILROAD RAIL PRESSURE BUTT WELDING
Filed June 17, 1960   33 Sheets-Sheet 1

INVENTORS
ROBERT H. BENNEWITZ
HARLAND R. HEDLUND
HARRY K. WETHE
BY Richard S. Shreve Jr.
ATTORNEY

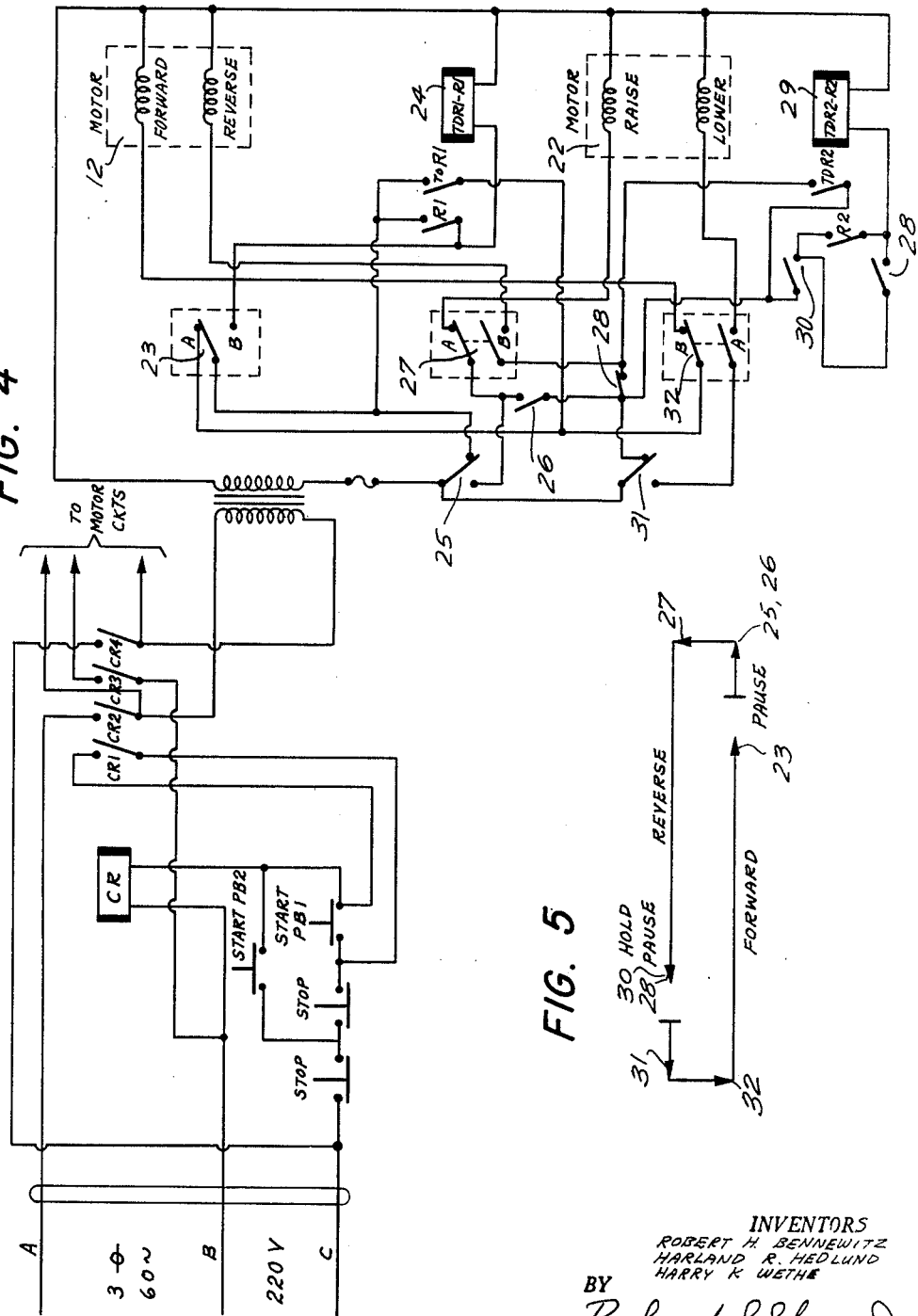

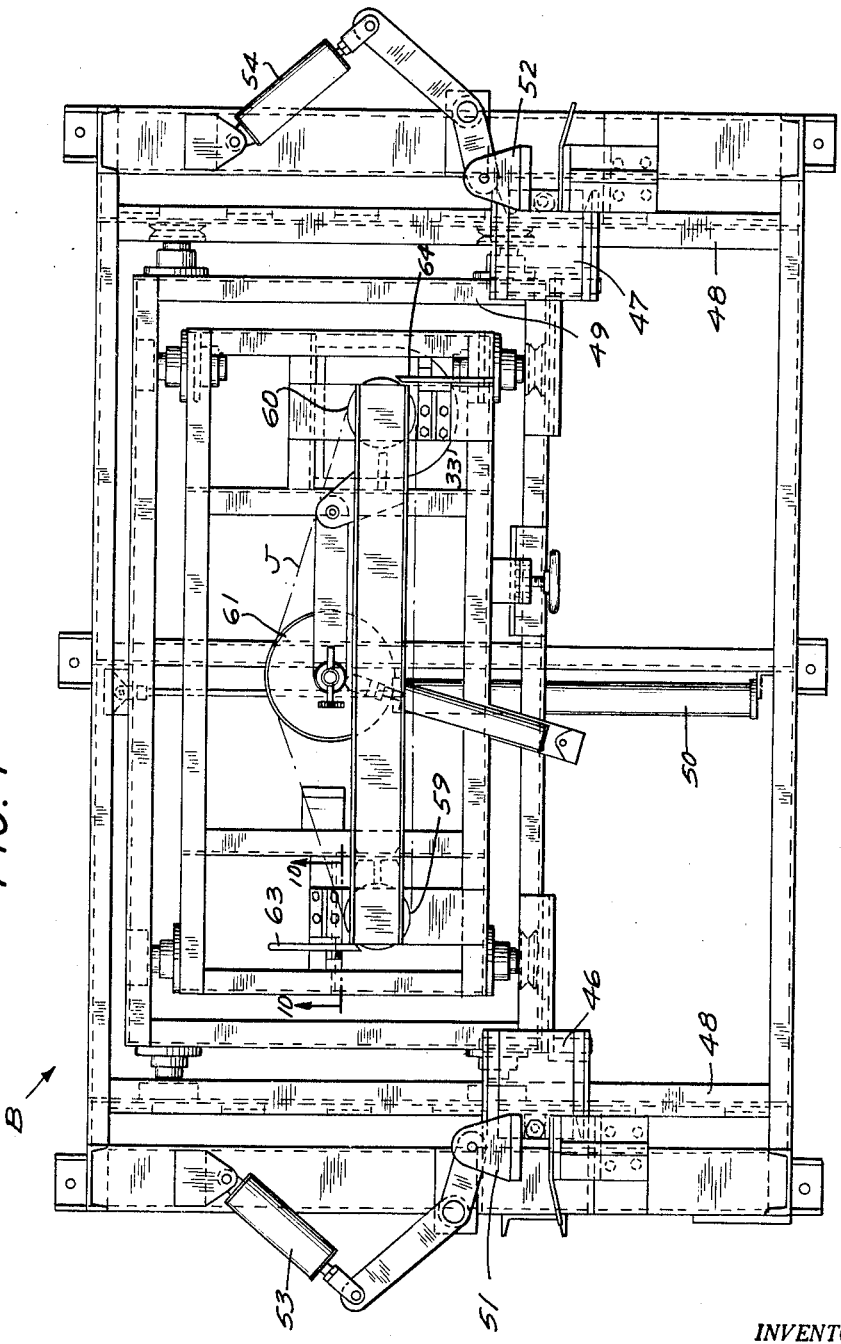

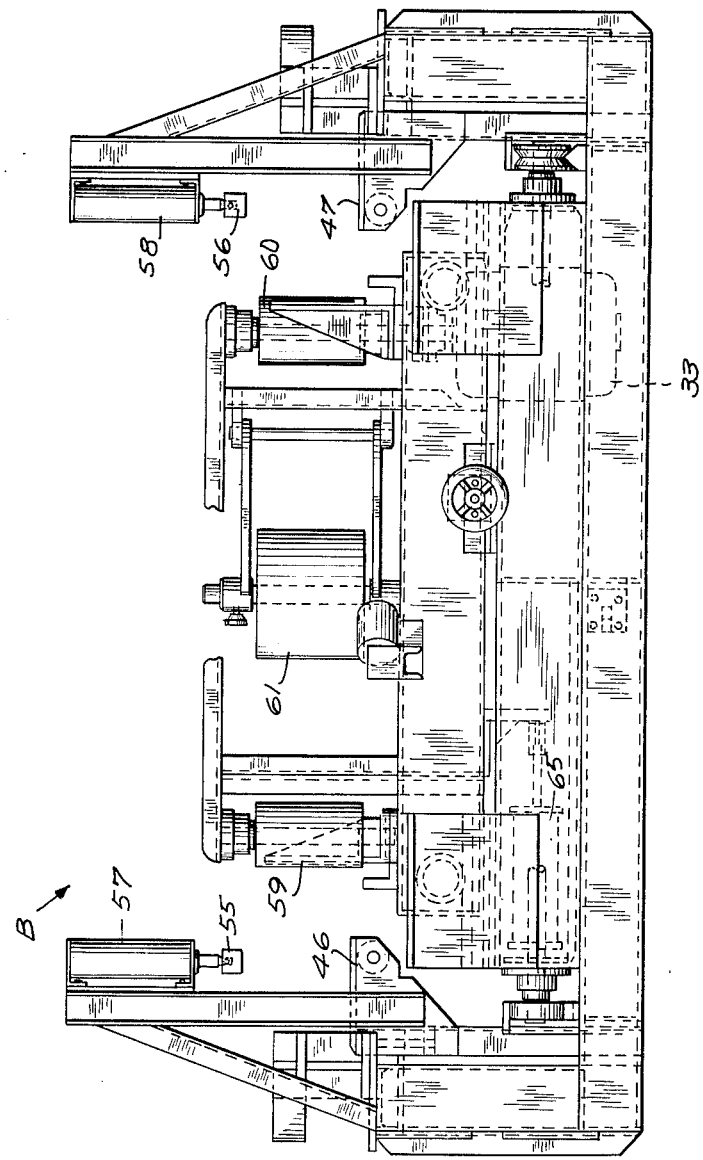

Oct. 19, 1965    R. H. BENNEWITZ ETAL    3,212,184
RAILROAD RAIL PRESSURE BUTT WELDING
Filed June 17, 1960    33 Sheets-Sheet 7

INVENTORS
ROBERT H. BENNEWITZ
HARLAND R. HEDLUND
HARRY K. WETHE
BY Richard S. Shreve Jr.
ATTORNEY Oct. 19, 1965  R. H. BENNEWITZ ETAL  3,212,184
RAILROAD RAIL PRESSURE BUTT WELDING
Filed June 17, 1960  33 Sheets-Sheet 10

INVENTORS
ROBERT H. BENNEWITZ
HARLAND R. HEDLUND
HARRY K. WETHE
BY
Richard S. Shreve Jr.
ATTORNEY

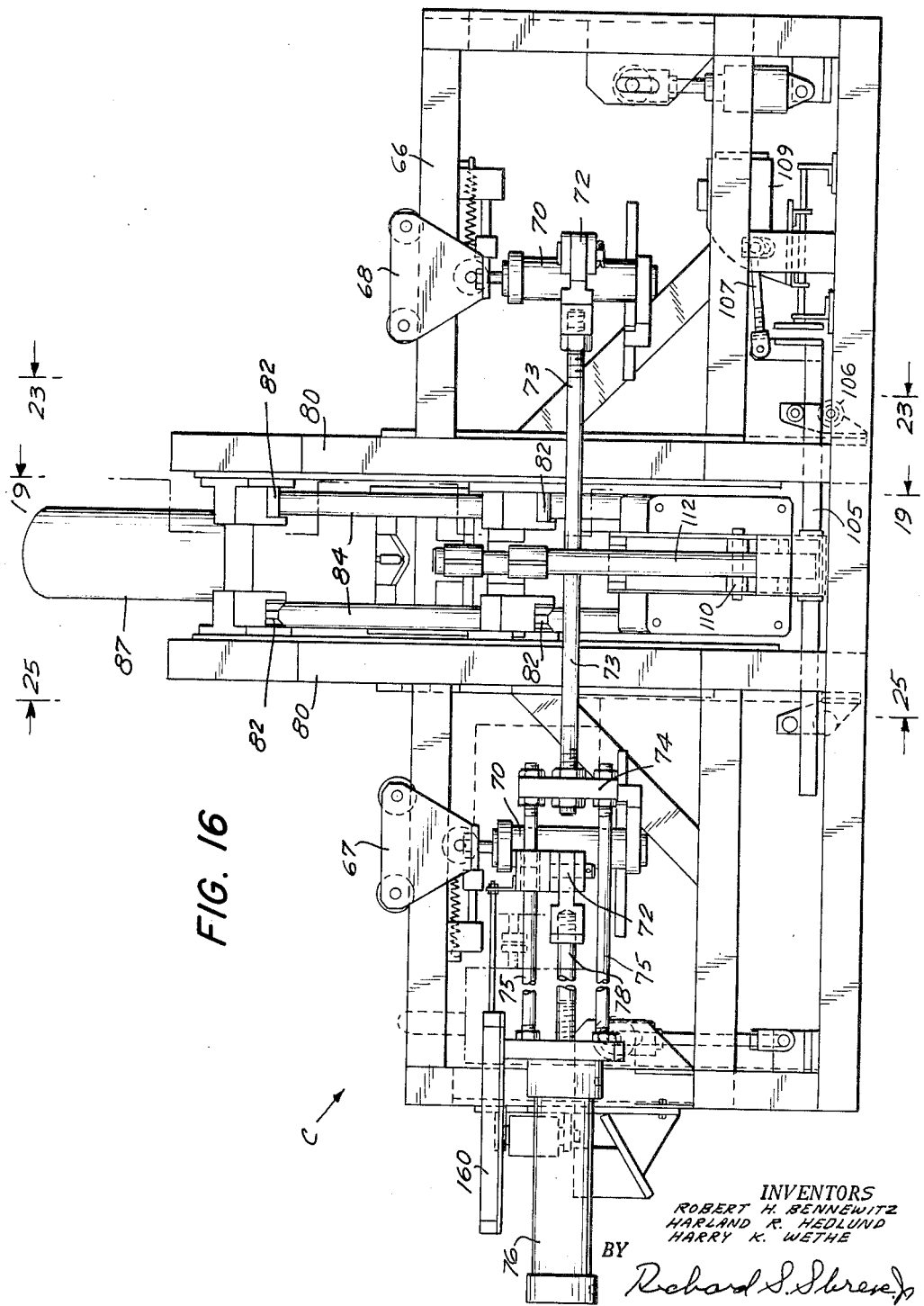

INVENTORS
ROBERT H. BENNEWITZ
HARLAND R. HEDLUND
HARRY K. WETHE
BY Richard S. Sbrensh
ATTORNEY Oct. 19, 1965    R. H. BENNEWITZ ETAL    3,212,184
RAILROAD RAIL PRESSURE BUTT WELDING
Filed June 17, 1960    33 Sheets-Sheet 13

INVENTORS
ROBERT H. BENNEWITZ
HARLAND R. HEDLUND
HARRY K. WETHE
BY
Richard S. Shreve Jr.
ATTORNEY INVENTORS
ROBERT H. BENNEWITZ
HARLAND R. HEDLUND
HARRY K. WETHE
BY Richard S. Shreve Jr.
ATTORNEY Oct. 19, 1965 R. H. BENNEWITZ ETAL 3,212,184
RAILROAD RAIL PRESSURE BUTT WELDING
Filed June 17, 1960 33 Sheets-Sheet 15

INVENTORS
ROBERT H. BENNEWITZ
HARLAND R. HEDLUND
HARRY K. WETHE
BY
Richard S. Shreve Jr.
ATTORNEY Oct. 19, 1965 R. H. BENNEWITZ ETAL 3,212,184
RAILROAD RAIL PRESSURE BUTT WELDING
Filed June 17, 1960 33 Sheets-Sheet 16

INVENTORS
ROBERT H. BENNEWITZ
HARLAND R. HEDLUND
HARRY K. WETHE
BY
Richard S. Shreve Jr.
ATTORNEY Oct. 19, 1965    R. H. BENNEWITZ ETAL    3,212,184
RAILROAD RAIL PRESSURE BUTT WELDING
Filed June 17, 1960    33 Sheets-Sheet 19
*FIG. 29*
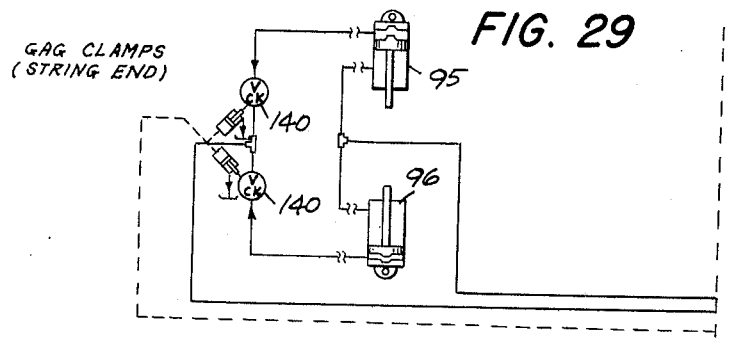
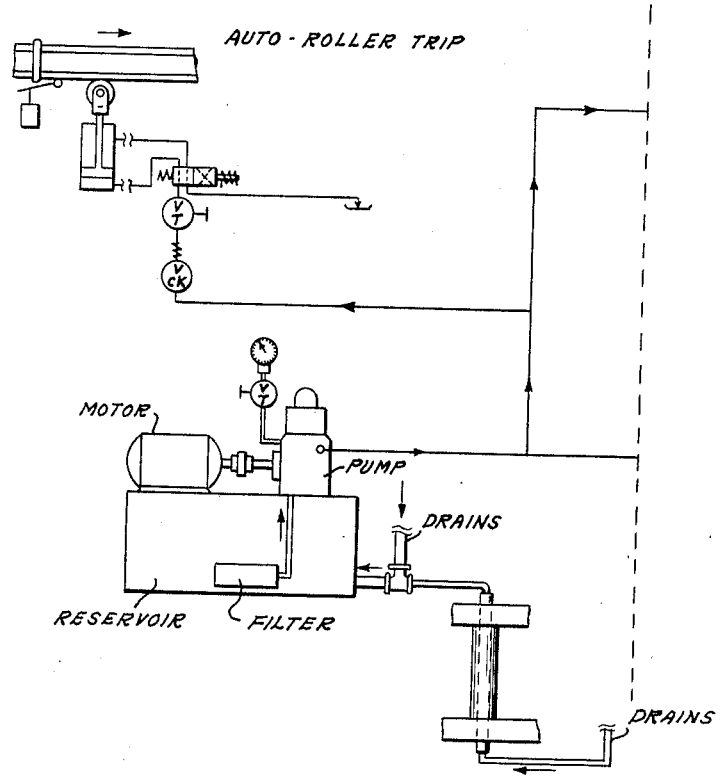
INVENTORS
ROBERT H. BENNEWITZ
HARLAND R. HEDLUND
HARRY K. WETHE
BY Richard S. Shreve Jr.
ATTORNEY

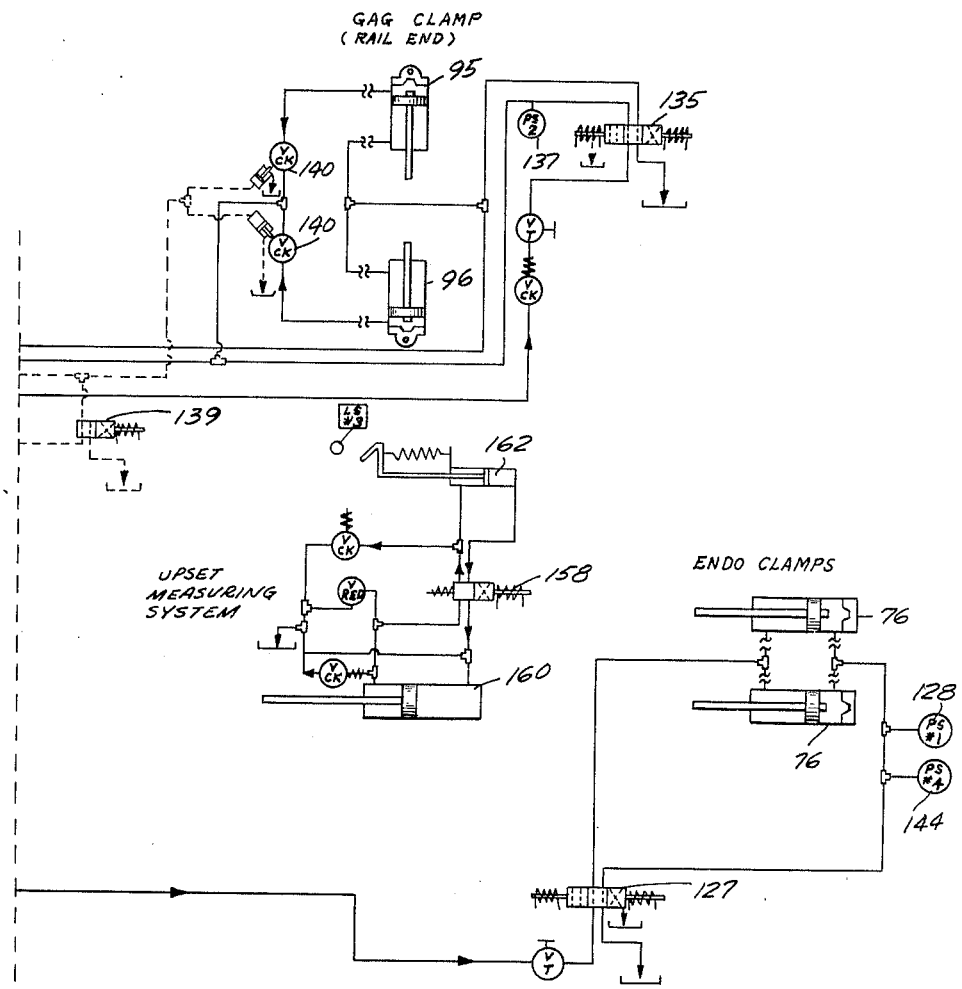

Oct. 19, 1965    R. H. BENNEWITZ ETAL    3,212,184
RAILROAD RAIL PRESSURE BUTT WELDING
Filed June 17, 1960    33 Sheets-Sheet 22

INVENTORS
ROBERT H. BENNEWITZ
HARLAND R. HEDLUND
HARRY K. WETHE
BY
Richard S. Shreve Jr.
ATTORNEY

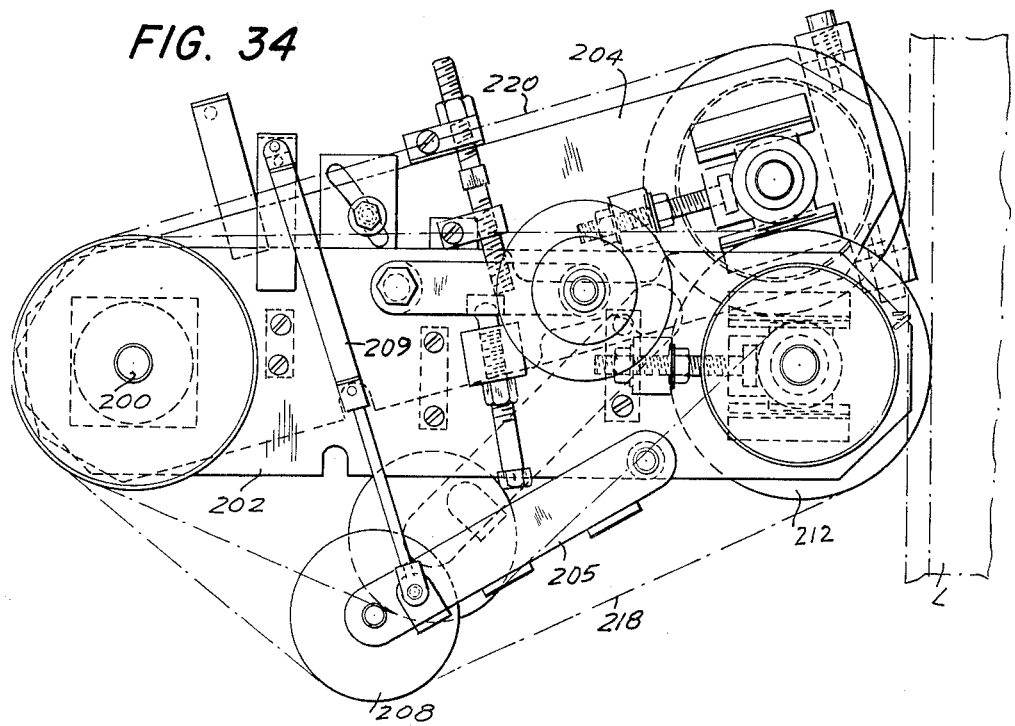
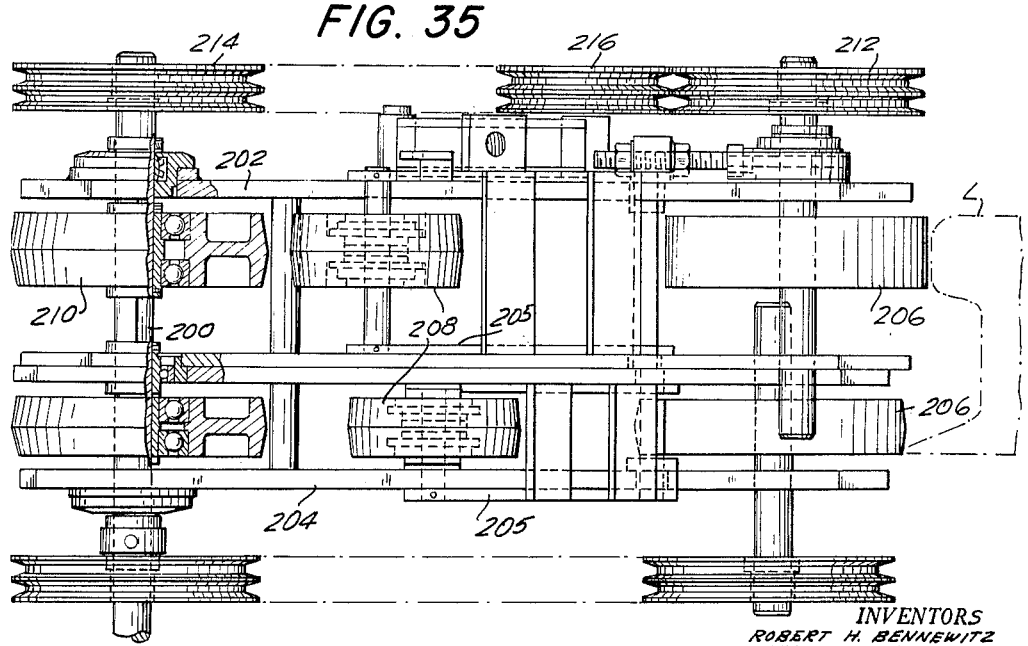

Oct. 19, 1965   R. H. BENNEWITZ ETAL   3,212,184
RAILROAD RAIL PRESSURE BUTT WELDING
Filed June 17, 1960   33 Sheets-Sheet 26

INVENTORS
ROBERT H. BENNEWITZ
HARLAND R. HEDLUND
HARRY K. WETHE
BY Richard S. Shreve Jr.
ATTORNEY Oct. 19, 1965 R. H. BENNEWITZ ETAL 3,212,184
RAILROAD RAIL PRESSURE BUTT WELDING
Filed June 17, 1960 33 Sheets-Sheet 27
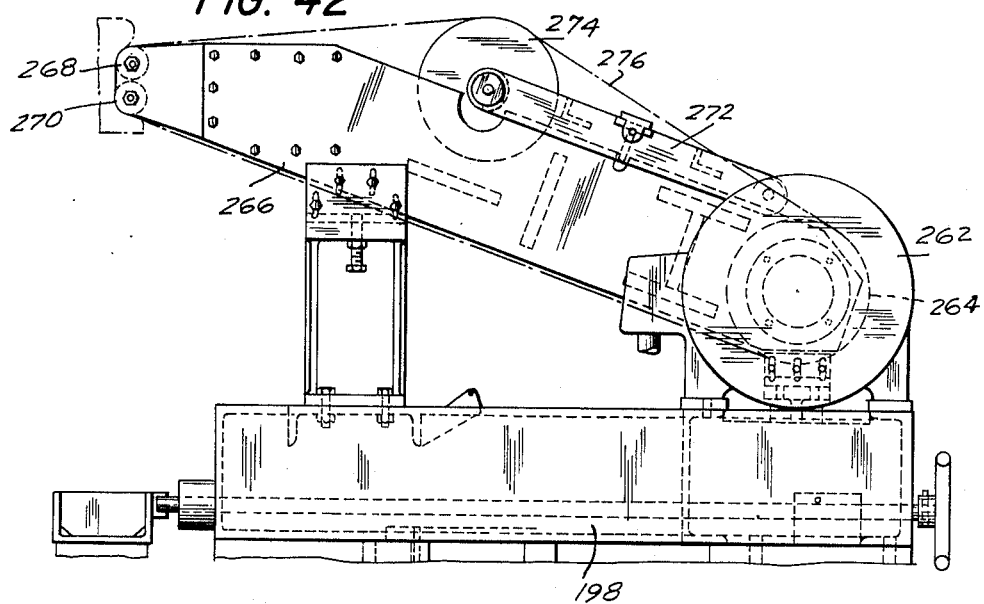
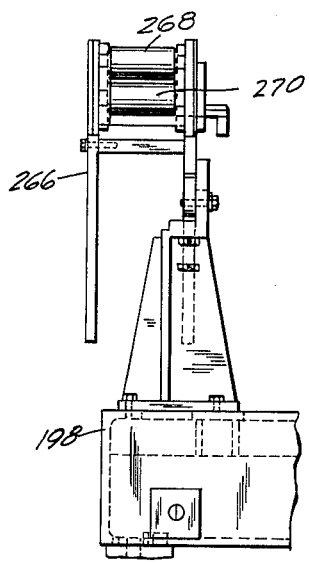
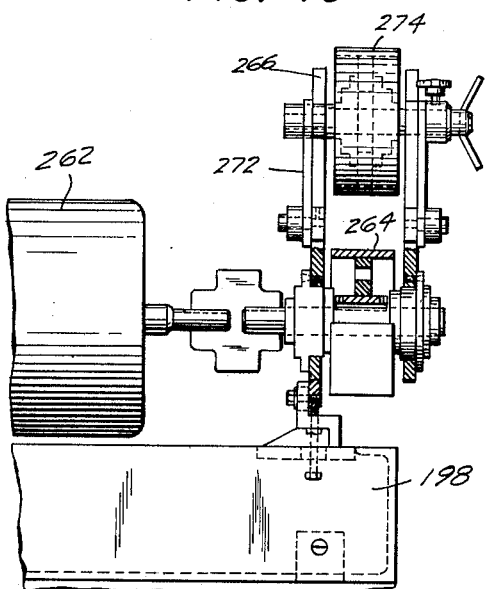
INVENTORS
ROBERT H. BENNEWITZ
HARLAND R. HEDLUND
HARRY K. WETHE
BY Richard S. Shreve Jr.
ATTORNEY Oct. 19, 1965 R. H. BENNEWITZ ETAL 3,212,184
RAILROAD RAIL PRESSURE BUTT WELDING
Filed June 17, 1960 33 Sheets-Sheet 29
FIG. 48
FIG. 47
SWITCH DUTY
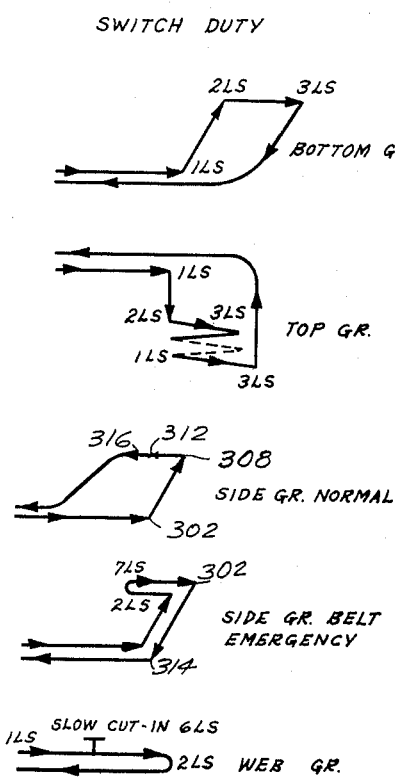
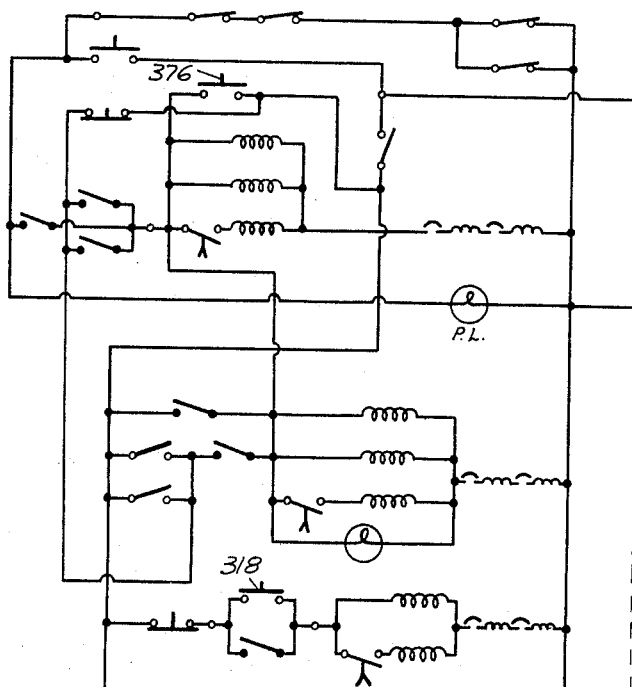
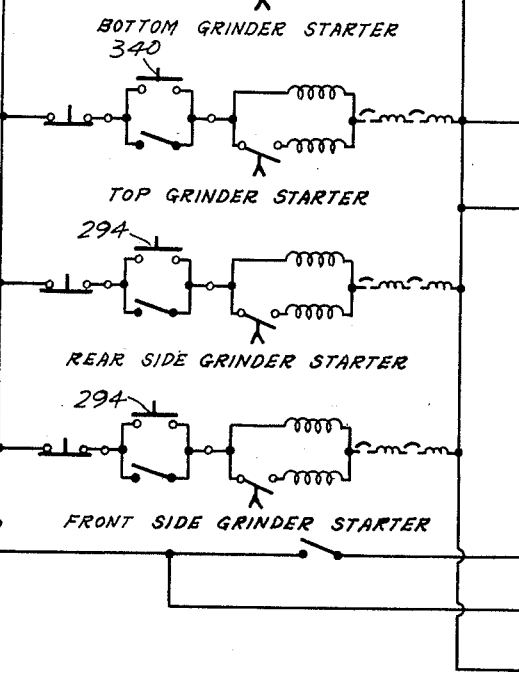
INVENTORS
ROBERT H. BENNEWITZ
HARLAND R. HEDLUND
HARRY K. WETHE
BY Richard S. Shreve
ATTORNEY Oct. 19, 1965   R. H. BENNEWITZ ETAL   3,212,184
RAILROAD RAIL PRESSURE BUTT WELDING
Filed June 17, 1960   33 Sheets-Sheet 30

INVENTORS
ROBERT H. BENNEWITZ
HARLAND R. HEDLUND
HARRY K. WETHE
BY
Richard S. Shreve
ATTORNEY

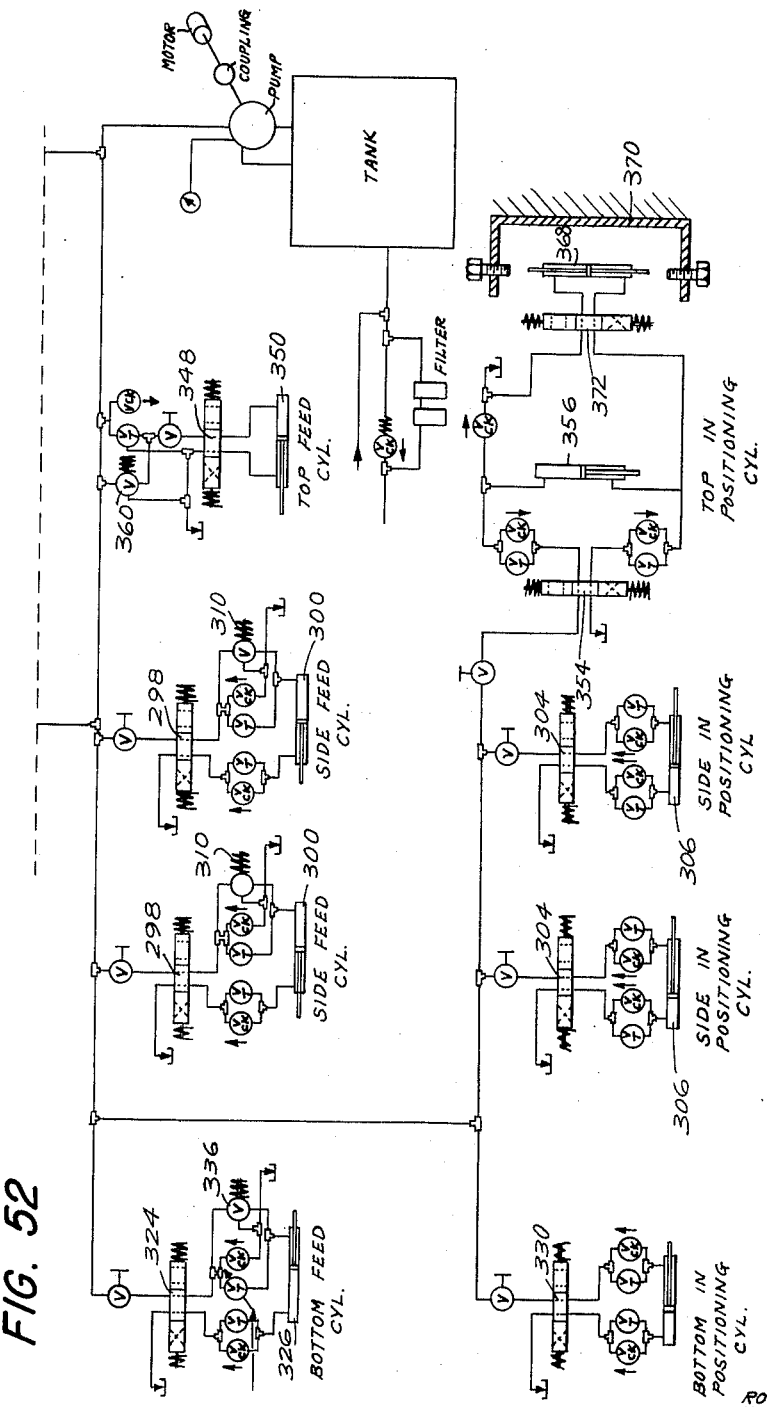

United States Patent Office 3,212,184
Patented Oct. 19, 1965

3,212,184
RAILROAD RAIL PRESSURE BUTT WELDING
Robert H. Bennewitz, Chicago, Ill., and Harland R. Hedlund, St. Paul, and Harry K. Wethe, Minneapolis, Minn., assignors to Union Carbide Corporation, a corporation of New York
Filed June 17, 1960, Ser. No. 36,999
3 Claims. (Cl. 29—475)

This invention relates to pressure butt welding of railroad rail, and more particularly is concerned with method and apparatus for the production of continuous lengths of pressure butt welded rail.

The acceptance of pressure butt welding by the railroad industry has been hindered by lack of consistency in the metallurgical properties of the pressure-weld. Some of this difficulty has been caused by problems in aligning the rail ends prior and during the welding operation. A further serious problem has been in controlling the amount of upset occurring during the making of the weld.

A serious difficulty has always been variation in section from rail to rail, such variation being within the specification of rail manufacture, but the degree of this variation has presented great difficulty in balancing railends of different cross-section so as to accomplish even distribution of the force applied over the cross-sectional area of widely varying section. That the mileage of such trackage is what it is today, has been due to the skill of operators who developed an art in judging the significance of the various factors and, along with manual skill in operating the equipment managed to produce acceptable welds.

There has developed a demand for relatively inexpensive and reliable improved method and apparatus for producing in railway rails joints of unusually high strength and alignment, and of consistently high metallurgical quality to withstand the severe service on railroad rail imposed by the highest train speeds and wheel loads in railroad history.

Another object is to provide new apparatus by means of which the production of pressure butt welded joints can be increased substantially.

The process of pressure butt welding is of the "solid phase" type described in U.S. Patent No. 2,344,534 issued on February 11, 1941, to Oskar Renner, Jr. In the present method, the principal factors and their interactions have been analyzed meticulously to effect improvements in weld quality and rail alignment which could not be reproduced reliably by previous methods.

One of the most difficult problems has been in the finishing of the pressure-weld, that is, in the complete removal of that excess metal which must be finished flush, such as the top and inside surfaces of the rail ball; and further, dressing the excess metal which can be left on the rail joint but which dressing must be done for, among other purposes, weld inspection. Further, dressing has been necessary to eliminate stress-raising concentrations such as sharp corners at the juncture of the weld metal and base metal, and also grinder marks.

Heretofore, for a rough finishing operation, one expedient has been to trim the excess metal away with an oxygen-cutting torch. This method while being fast, requires a skillful operator and appreciable quantities of oxygen, and there is the hazard of the oxygen jet piercing inadvertently the rail body. Another expedient for application to the rail ball only, has been a portable, hydraulically operated shearing device which roughly shears the excess metal from the top and two sides of the ball, such shearing being done while the metal is hot. Usually it is necessary to employ the expensive expedient of reheating the weld section of the rail to get it hot enough for said shearing.

Next, after the rough metal removal, the weld joint is finished to final size by grinding, the sequence of such grinding varying in different installations. All of the grinding in this sequence of rail pressure-weld finishing has been done heretofore with manually-operated grinders.

All railroads make it standard practice to finish three sides of the ball to be flush with the adjacent rail surfaces. Other railroads finish grind the bottom of the base to be flush, although some only remove enough metal for inspection. The sides of the base are always finished flush so the rail will fit into a tie-plate.

Whereas heretofore the railroads seem to only grind the web and the adjacent base and ball surfaces enough to give a good inspection, although the definite trend is toward still more complete finishing of all surfaces.

Further, as an example, two operators conventionally are used to grind the rail web section of the pressure-weld. Also, in present systems, one operator is required to manipulate a winch to pull the pressure-welded rail through the base grinding unit, another operator is required at the base-grinding station, still another operator is required at the rail-ball grinding station, still another operator at the finish grinding station preparatory to the Magnaflux station. The complexity, space and inordinate expense in equipment and manpower has deterred the acceptance of continuous-welded rail.

Improved method of and means for removing upset metal was a principal object of a long and expensive development program. A careful survey of different known and established methods of removal indicated any attempt to remove the pressure-weld upset completely by grinding would prove completely impractical and excessively expensive, principally because the cycle would be too long.

It was conceived, however, during the development investigation that new method and apparatus might be conceived wherein belt grinding of the pressure-weld upset metal while said upset metal is in the hot plastic stage might be a solution to the severe problem. Still further, one of the most critical problems of producing continuous-welded rail is control of the grinding operation so as not to produce stress-raising marks which, thorough investigation has proved, act as stress-raising foci for the development of hairline cracks which ultimately cause rail failure in service. To emphasize further the degree of criticality of the presence of grinding cracks in rail, reference is made to a report by the Special Committee on Continuous Welded Rail, American Railway Engineering Association, in which it was discovered that an unexpectedly large percentage (25 percent) of rail failures regardless of welding process used, occur outside the weld proper, but in the area encompassed by welding grinding, from fractures caused by grinding cracks (see p. 906, American Railway Engineering Association—Bulletin, vol. 61, No. 556, February 1960).

According to the present invention, the pressure butt welded railroad rail is produced by feeding the incoming rails in succession into a production line containing power rolls and power pinch rolls spaced therealong, energizing said power rolls to advance said rails in succession to a welding station where they are pressure butt welded together and a weld upset is produced, and energizing said power pinch rolls beyond said welding station to advance the welded rail to bring the welded joint to a weld reducing station where the excess upset metal is reduced.

Preferably a nearer of said power rolls advances said fed rails to an end finisher station where the ends of the rails are prepared for welding, and a farther of said power rolls advances the end ground rails to said welding station.

Preferably the rails are fed by successively lifting them from a stack parallel to the production line by raising a saddle under the rails, advancing the saddle transversely toward the production line, halting the saddle in response to the presence of a preceding rail in the production line, resuming the advance in response to removal thereof, and lowering the saddle to deposit the oncoming rail onto an idler roll and a power roll in the line.

The power roll advances the rail over a lifter roll and on to abut the leading end thereof against a stop in the end finisher station. The lifter roll raises the trailing end of the rail to compensate for camber therein. A roller bearing a grinding belt is moved transversely to grind off the leading end of the rail. Another power roll advances the rail beyond the belt, then returns it to abut a stop for a second roller bearing the same belt. Moving the rollers transversely in the opposite direction grinds off the trailing end of the rail.

The second power roll advances the end finished rail to the welding station where the web sections of the rail ends are clamped and forced together preferably by hydraulic cylinders under a pressure of the order of 500 p.s.i. Transverse aligning dies are brought together upon the pressurized rail ends, transverse gag clamps are brought together on each side of the aligning dies with solid jaws at the leading end and roller jaws at the trailing end.

The aligning dies are retracted, the pressure in the rail ends is increased to the order of 3000 p.s.i., top and side welding heads and bottom and side welding heads are brought toward each other into welding position, and welding heat is applied to the highly pressurized rail ends, the roller jaws of the gag clamp permitting movement of the trailing rail as the end metal softens to form the upset.

Preferably, a magnified travel is produced in response to such movement, and the pressure on said web clamps is discontinued in response to a predetermined limit of such magnified travel.

In the form shown, the unique feature which solves the severe problem of pressure-weld upset control is a small cylinder mounted atop one of the main hydraulic cylinders, the small piston rod being fixed to the rail with clamping linkage to effect measurement and control of the total upset during welding.

Preferably the aligning dies are again brought together after the weld is completed, to effect a forging blow upon the upset metal.

The welded rail is advanced by power pinch rolls to a weld upset, or by a belt grinding operation to remove the duced. This may be done by a rolling operation upon the weld upset, or by a belt grinding operation to remove the upset welded material at a joint every 39 feet which has been produced by a welding machine. This weld is hot and the temperature range will be approximately 1,200 to 2,000 degrees. These temperatures give the best grinding conditions for the rail grinder. In case weld is cold, grinder will still grind off the weld upset, but life of grinding belts will be considerably less. The upset welding materials have been determined to be approximately ⅝ inch high.

The weld grinding machine is preferably mounted on a vehicle in the production line so as to move into register with the weld located by the welding station. A side grinder carriage in the vehicle has pivoted thereon ball grinder belts and flange grinder belts which swing inward for a grinding pass. A bottom grinder carriage has pivoted thereon a bottom grinder belt which swings upward for a bottom grinding pass. An overhead top grinder carriage has pivoted thereon a top grinder belt over a concave roller, which swings down for successive top grinder passes. The vehicle is then moved to bring web grinders into register, which move inwardly from both sides to grind the web.

From the weld upset reducing station the power pinch rolls advance the welded rail through an inspection station and between side grind rolls on to the train of flat cars.

Figure 2:
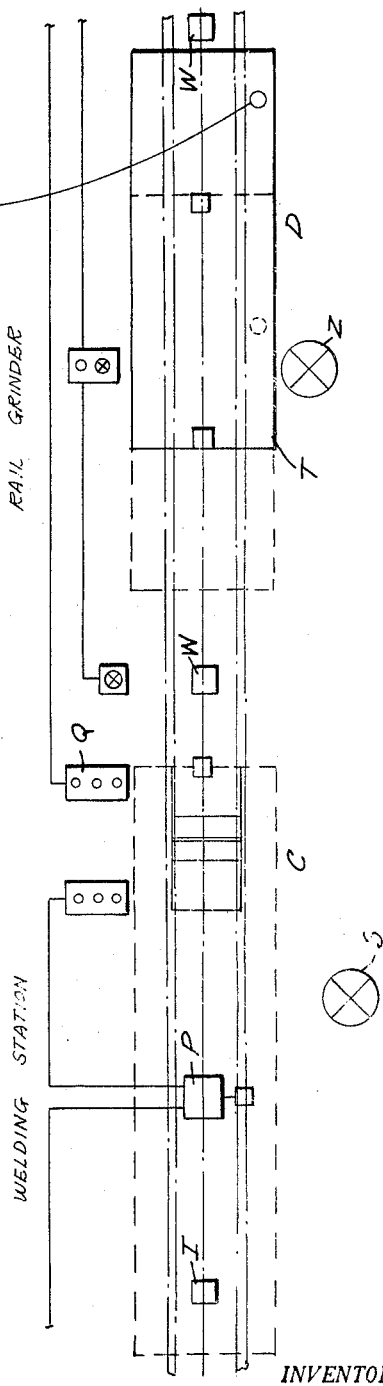
Figure 3:
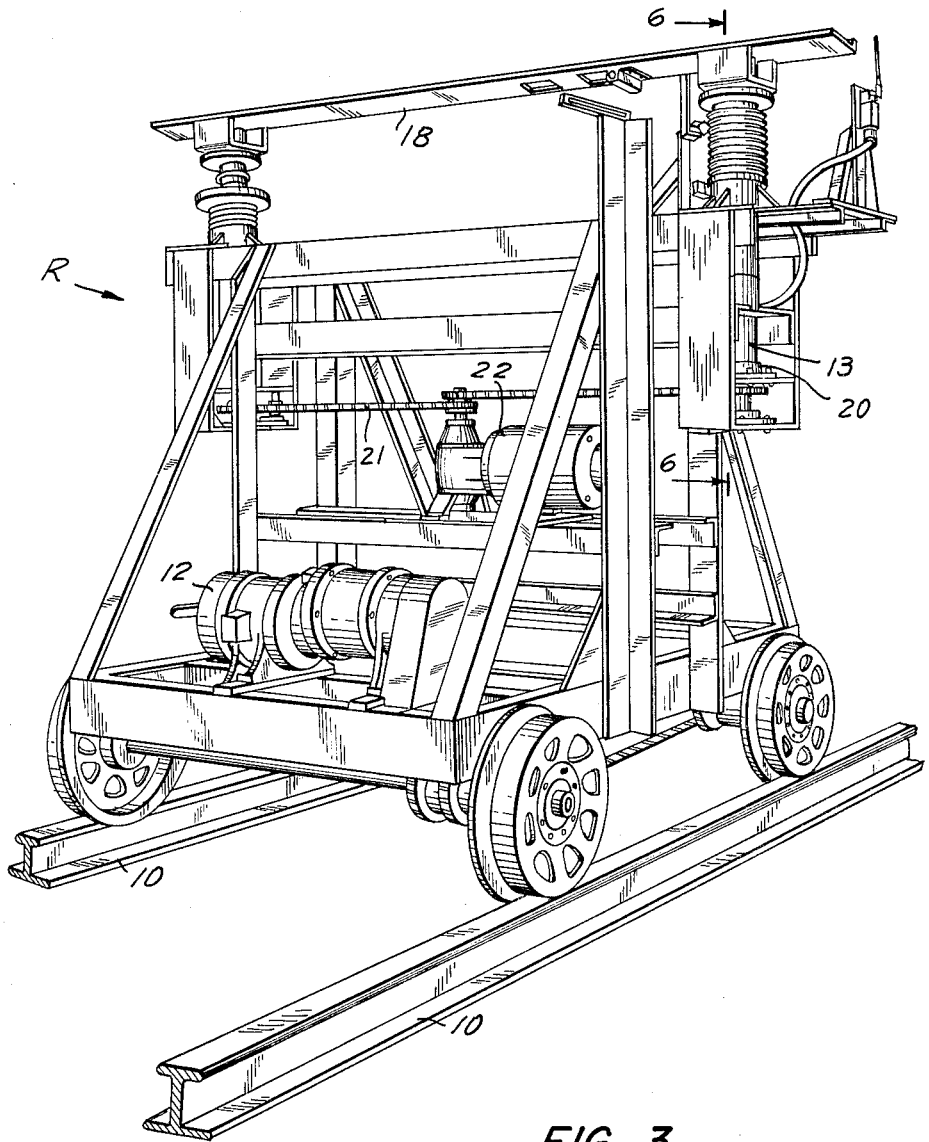
Figure 6:
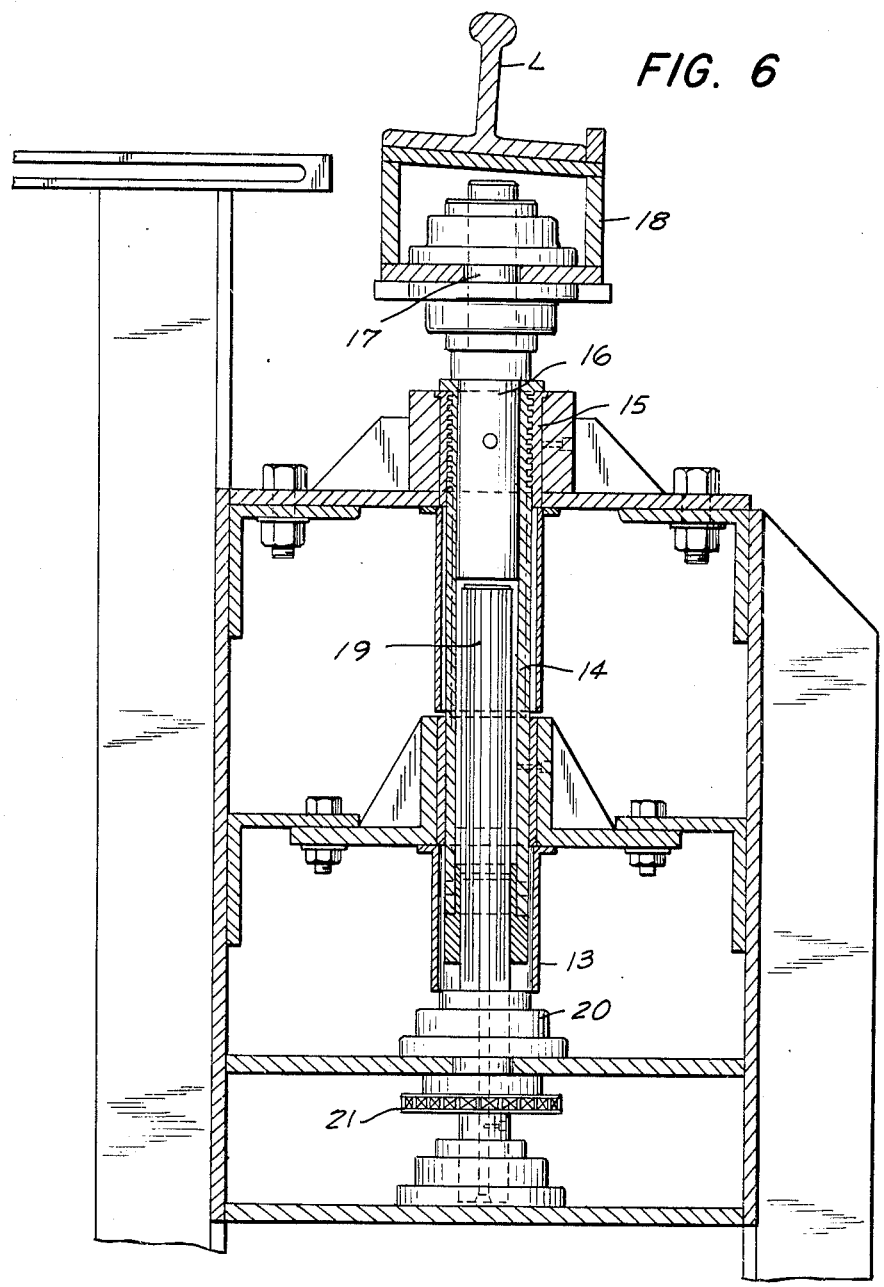
Figure 10:
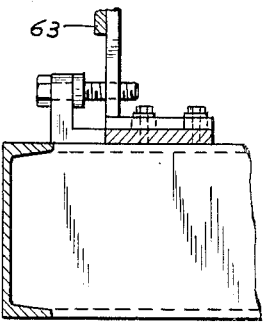
Figure 9:
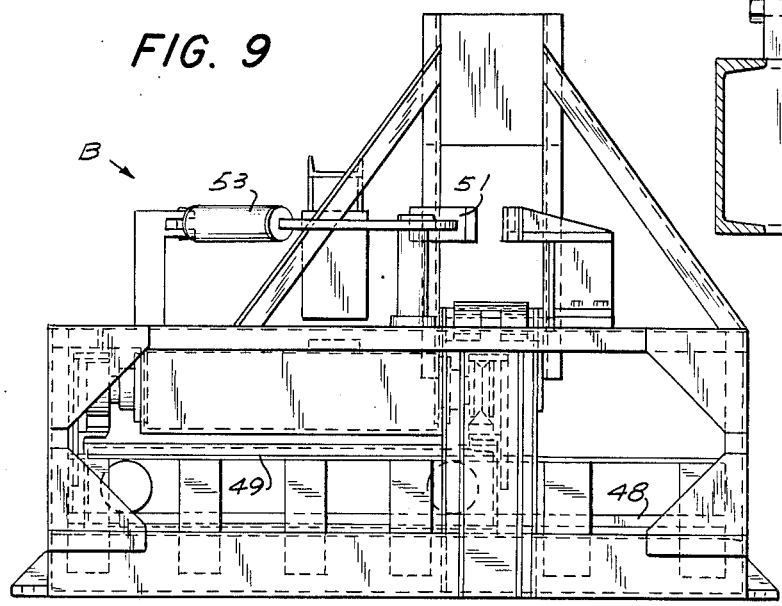
Figure 11:
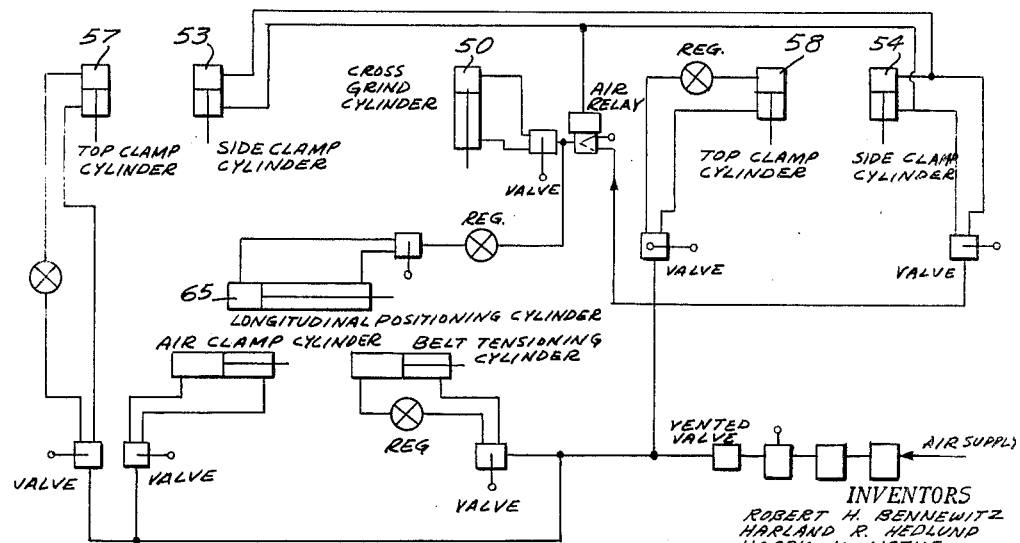
Figure 12:
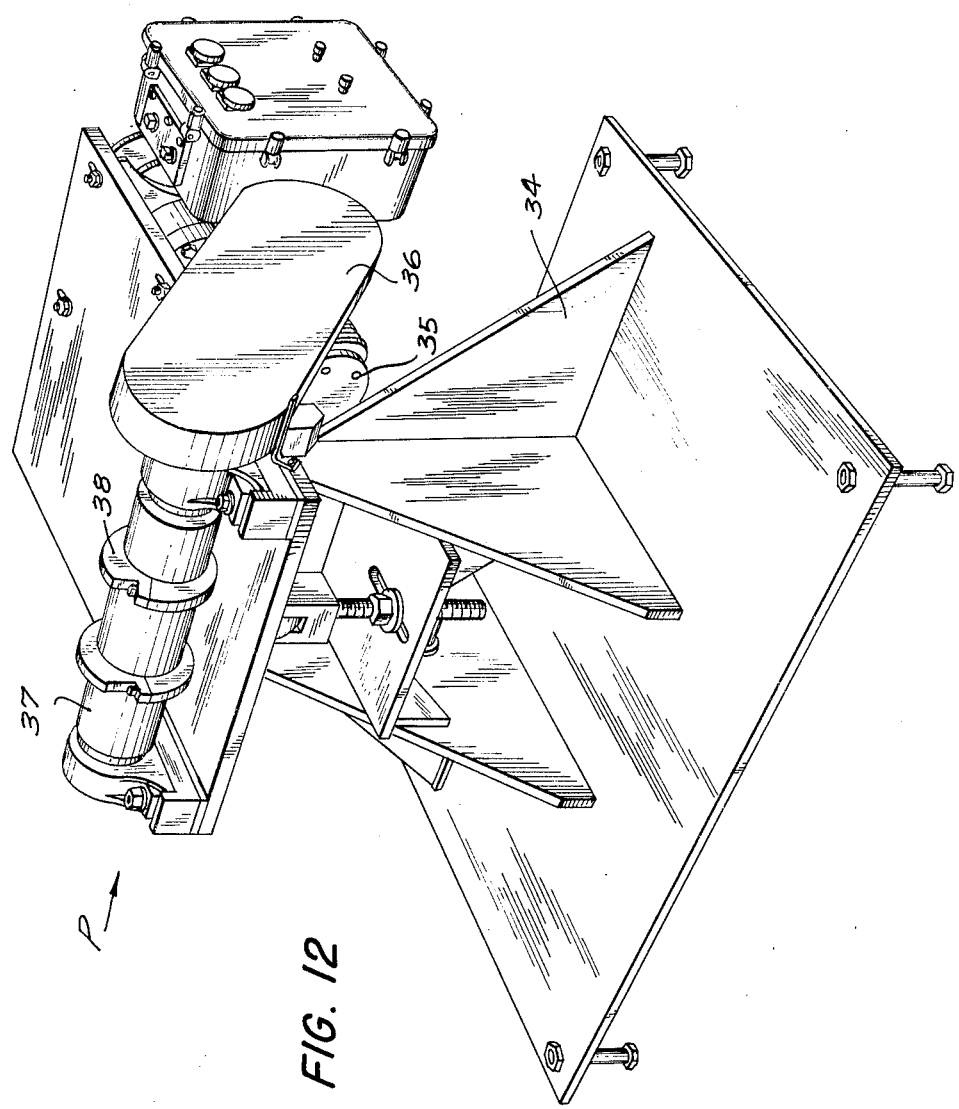
Figure 13:
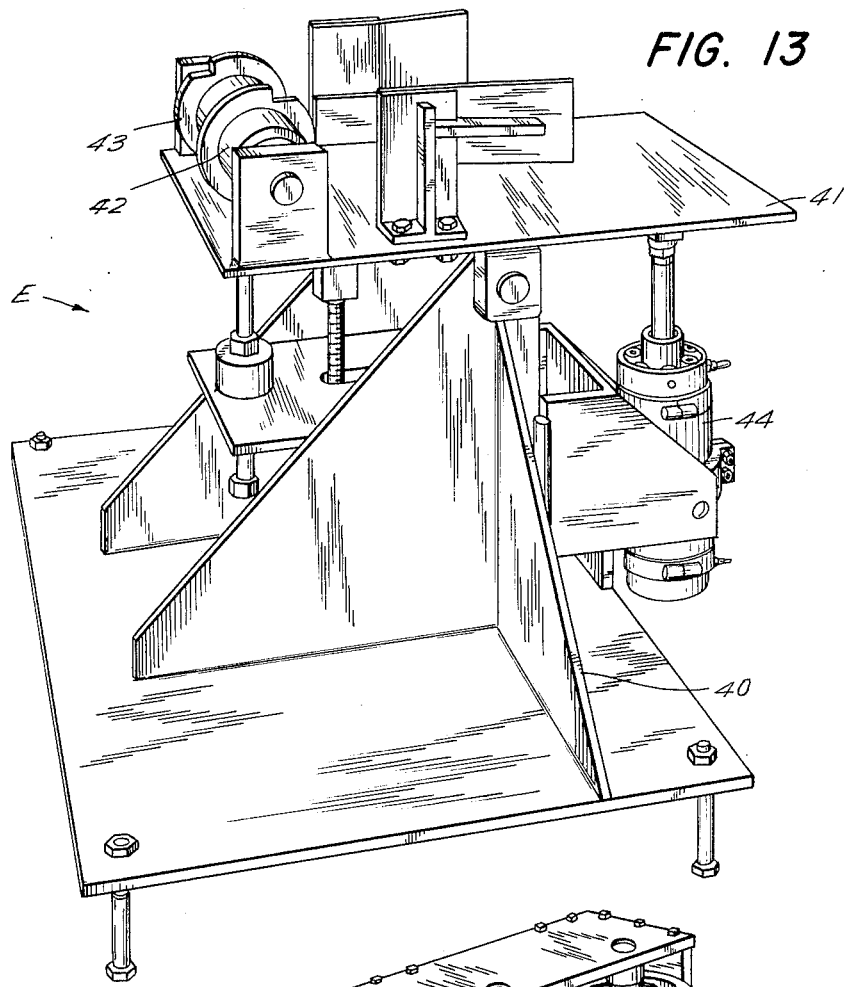
Figure 15:
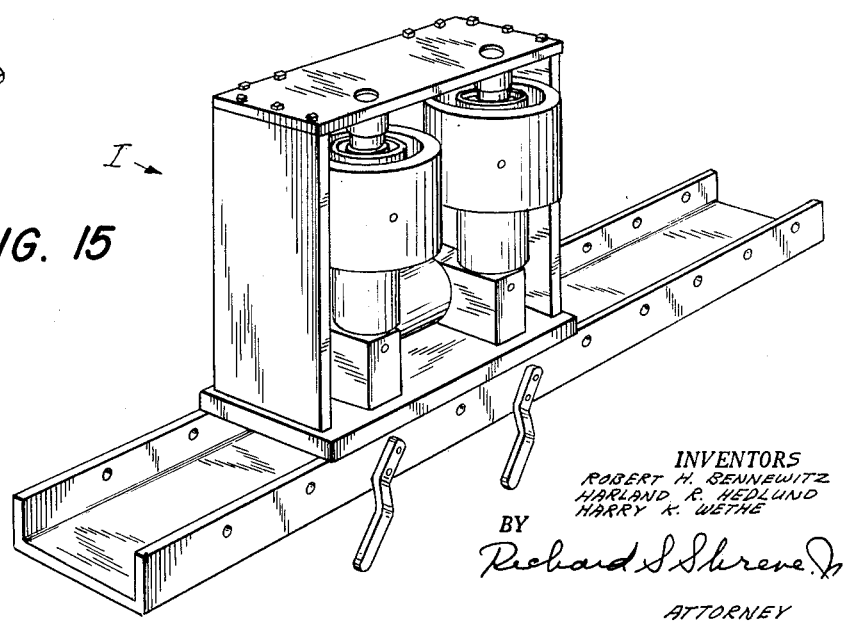
Figure 14:
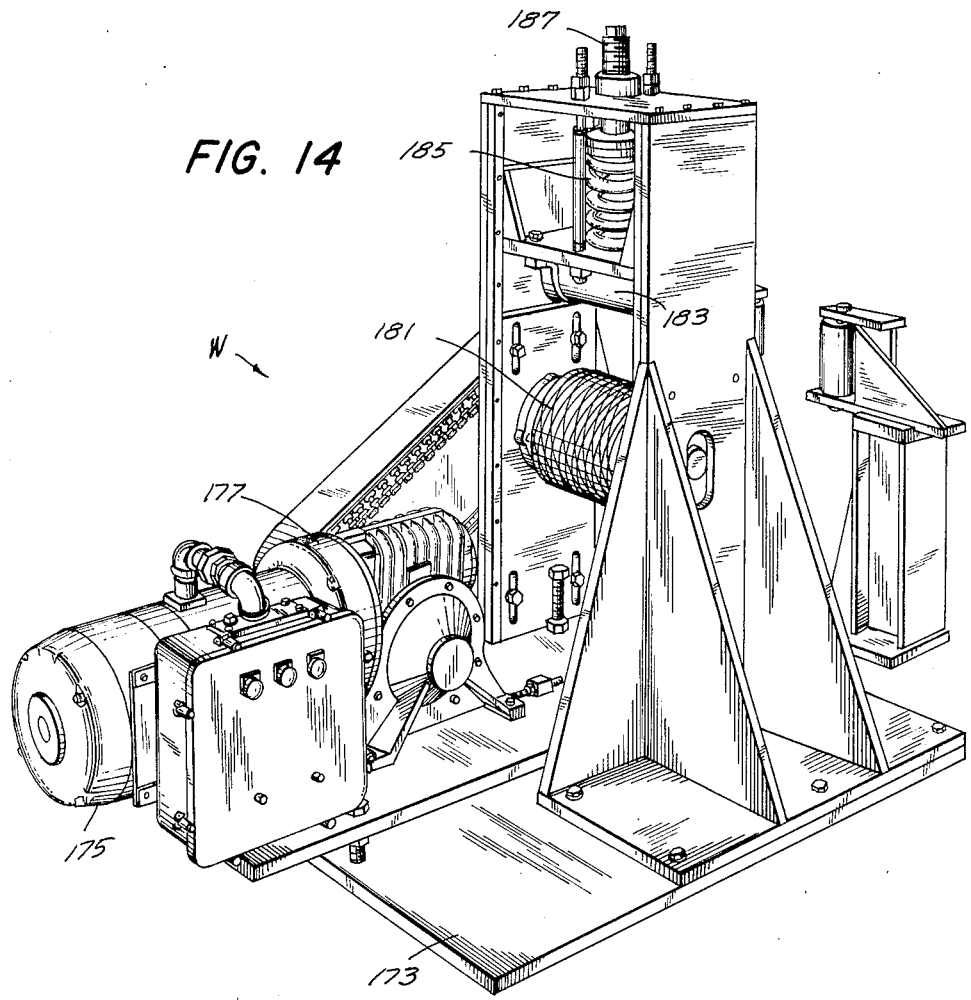
Figure 17:
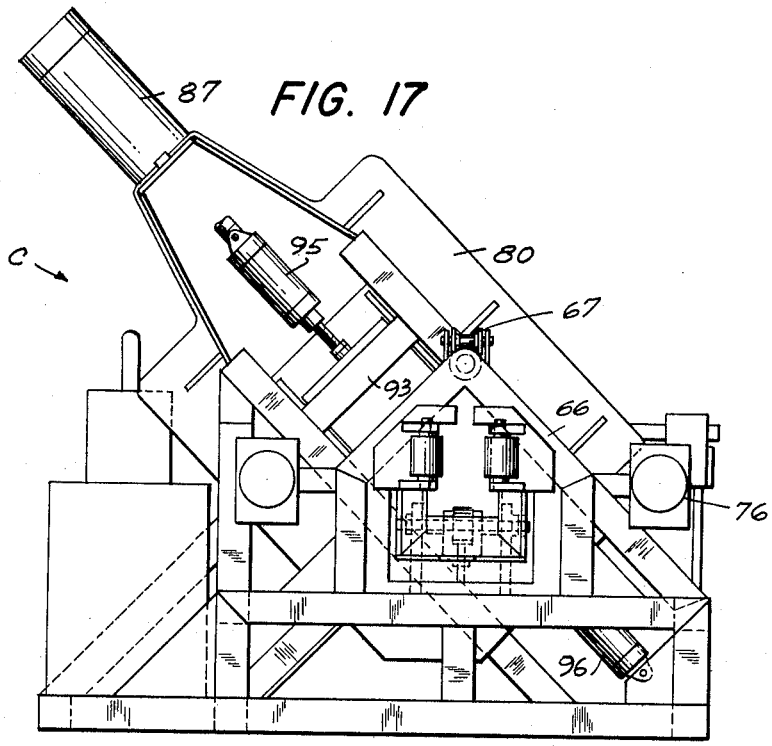
Figure 18:
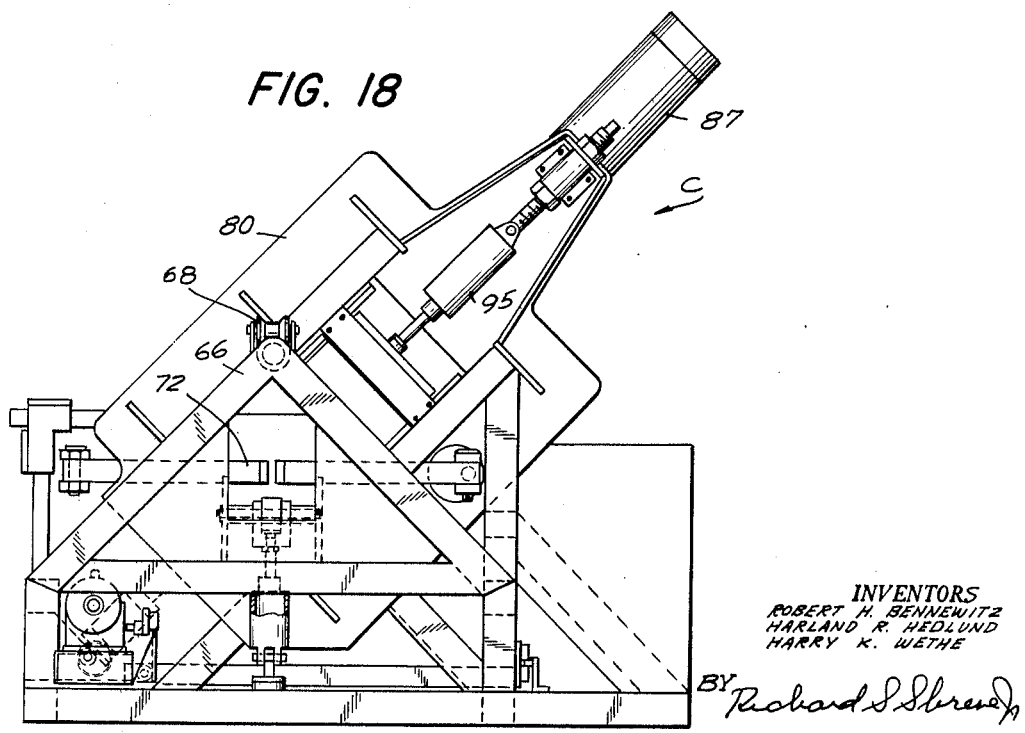
Figure 19:
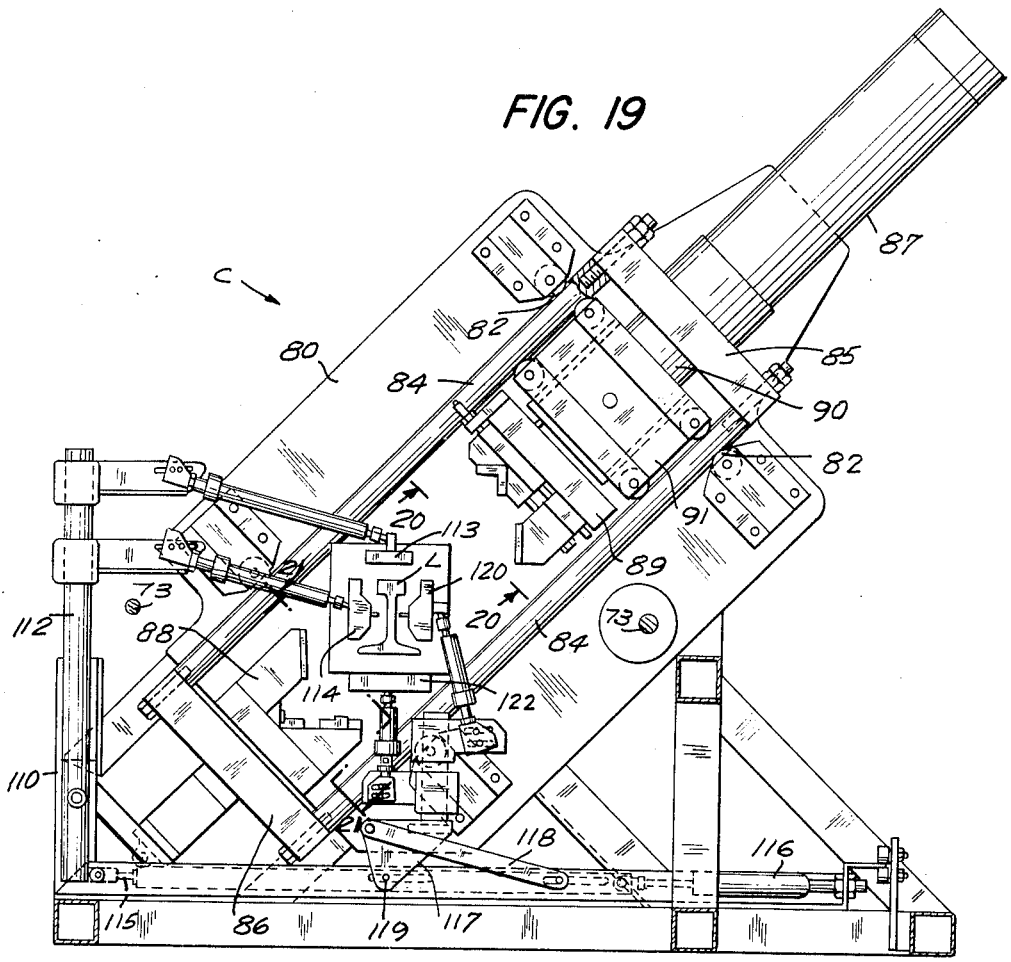
Figure 20:
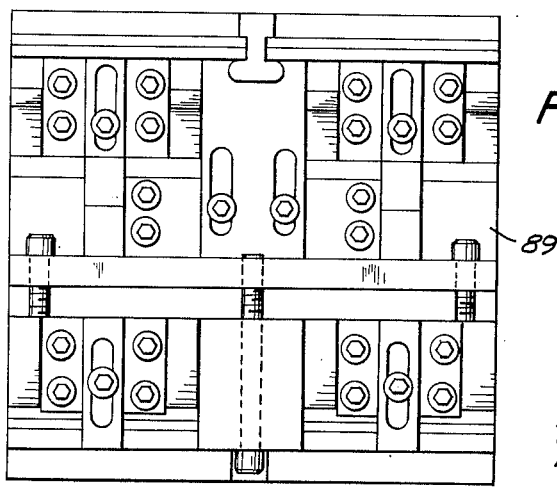
Figure 22:
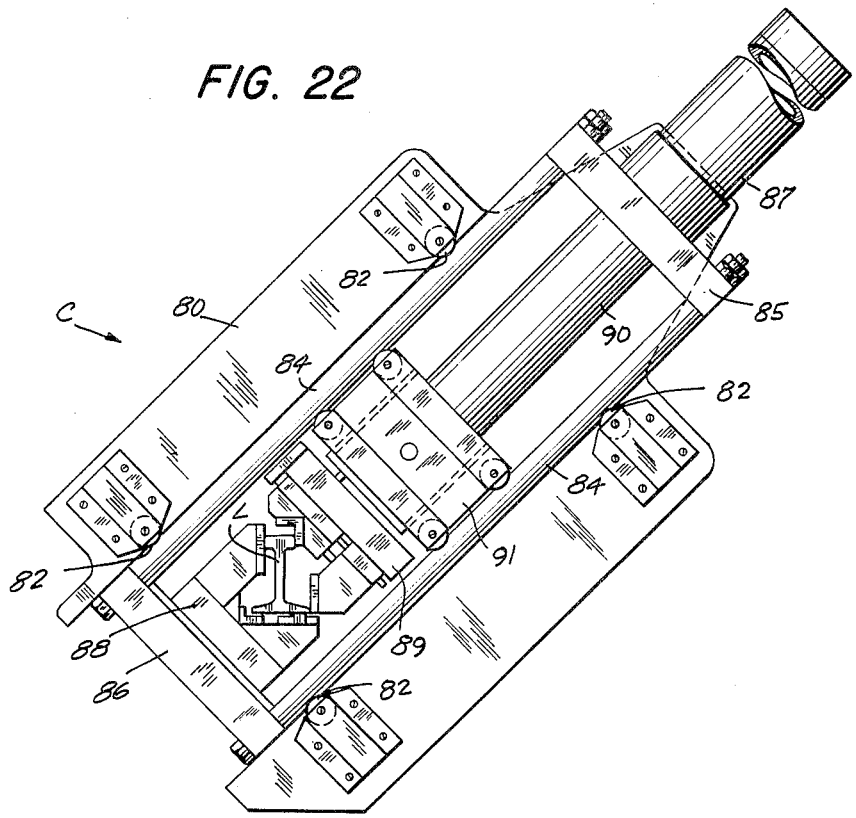
Figure 21:
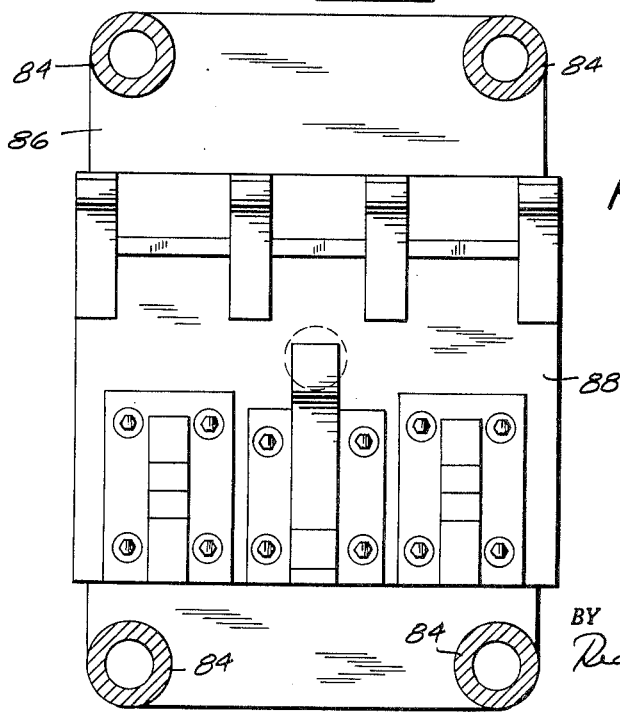
Figure 23:
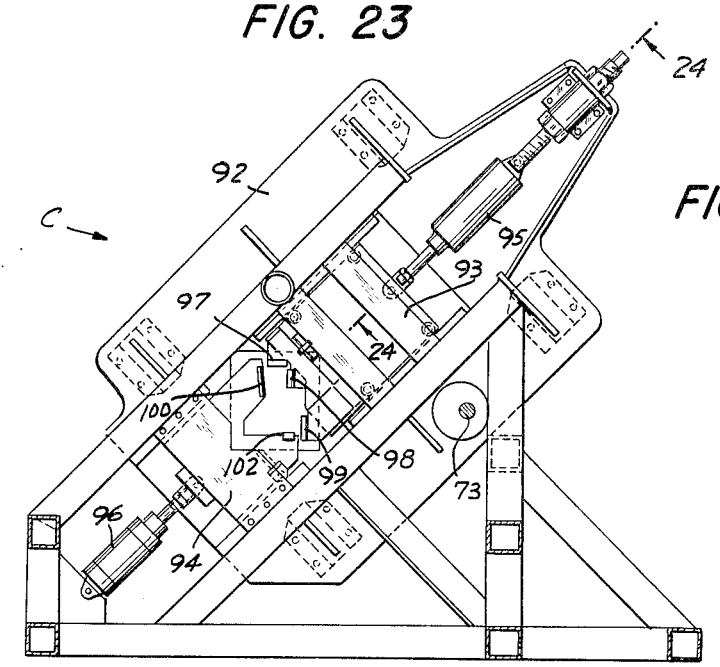
Figure 24:
Figure 25:
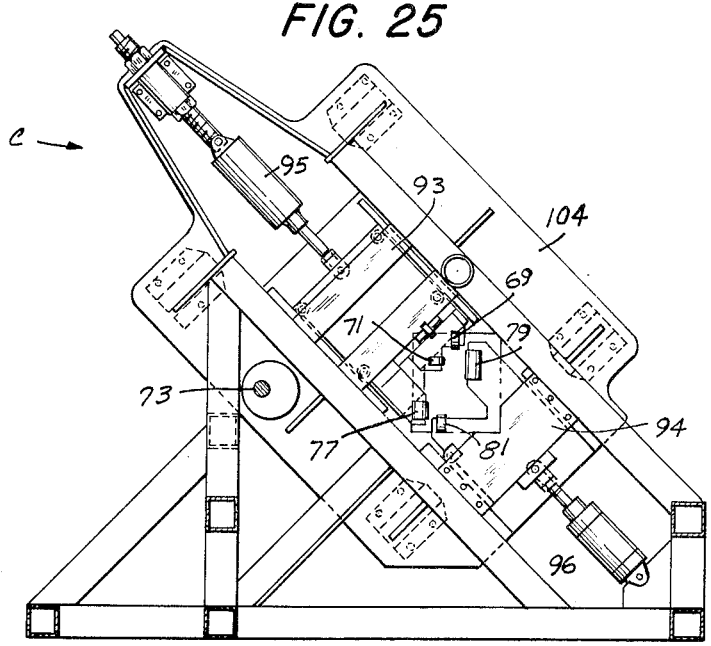
Figure 26:
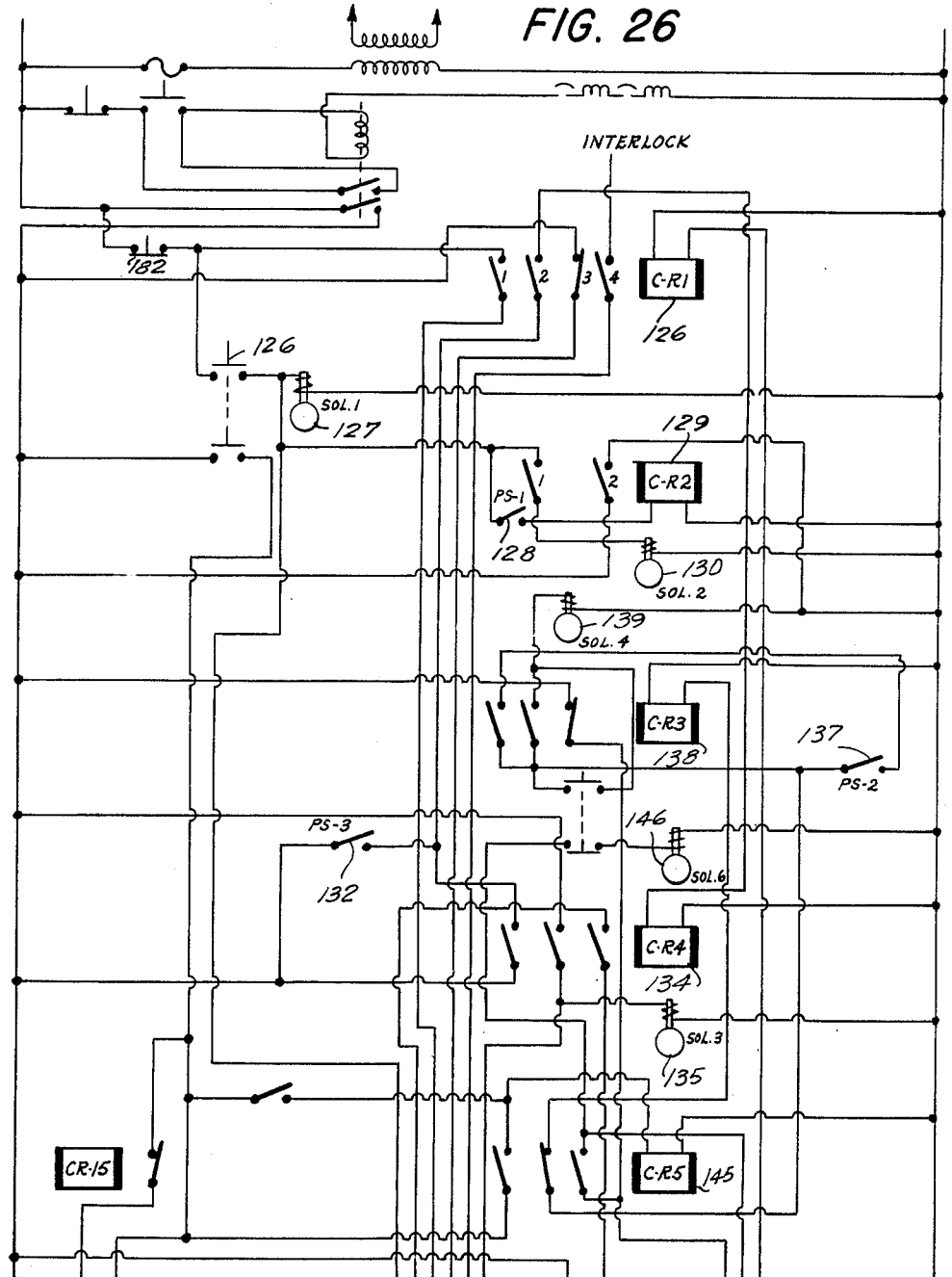
Figure 27:
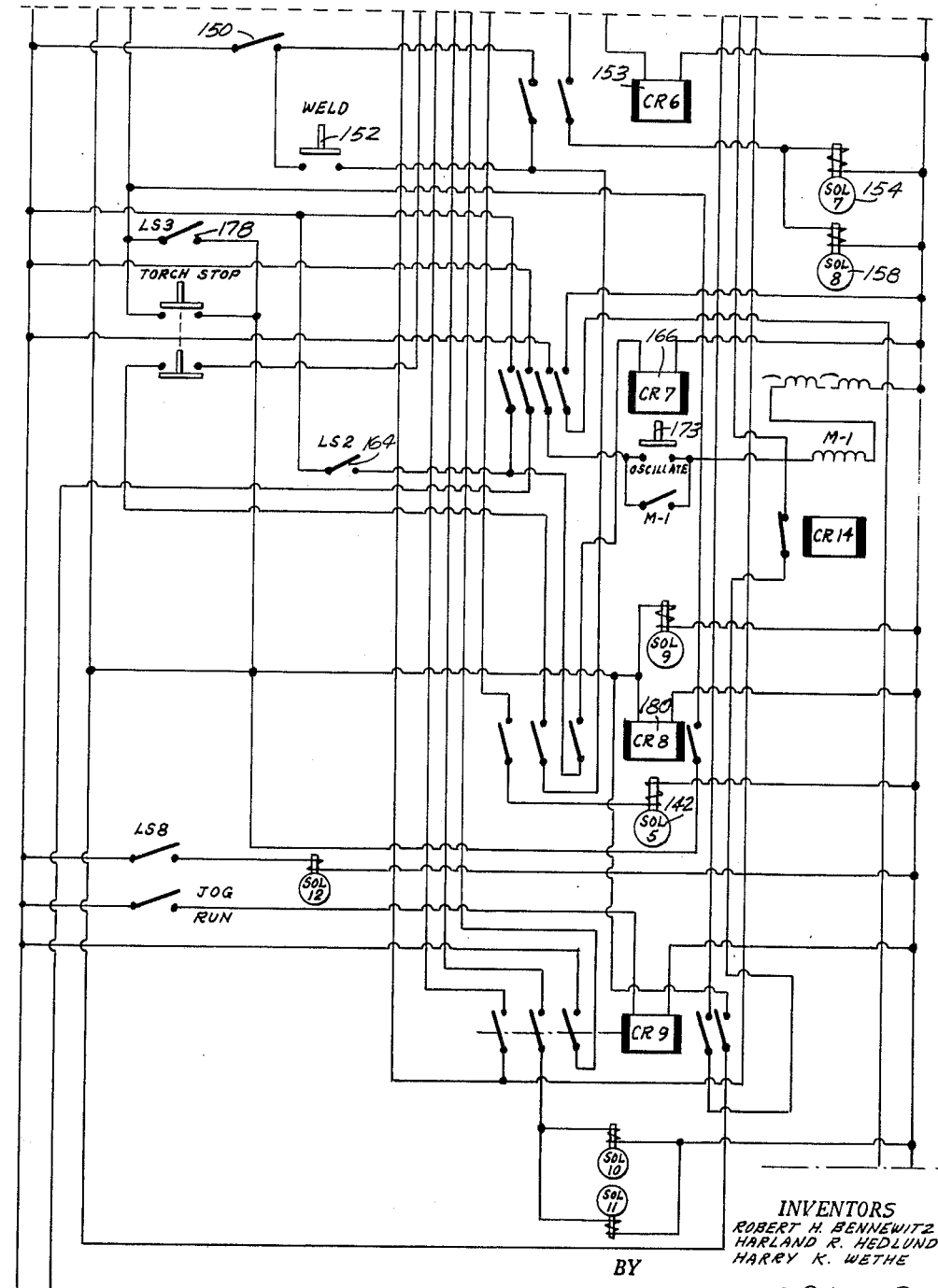
Figure 28:
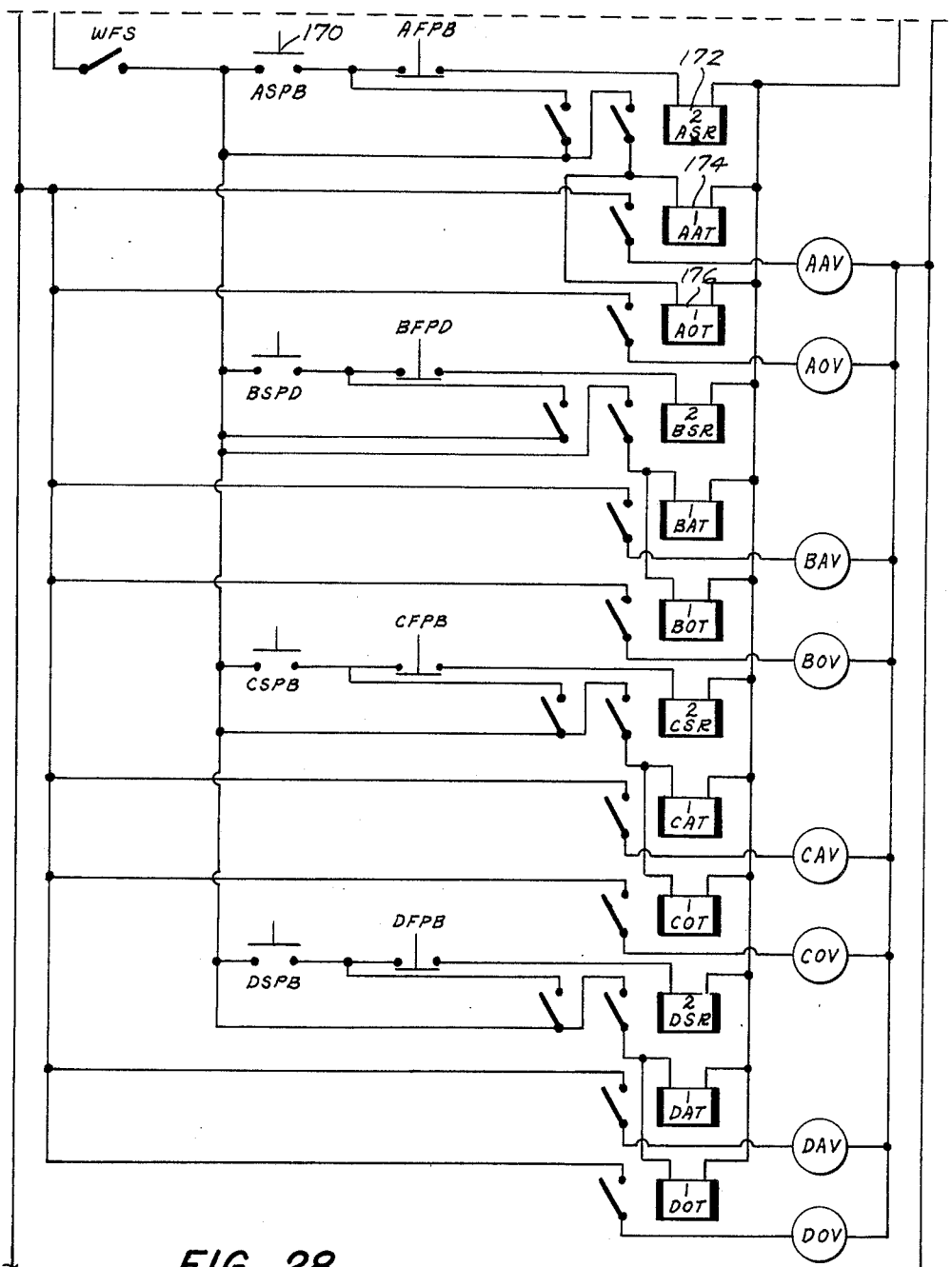
Figure 30:
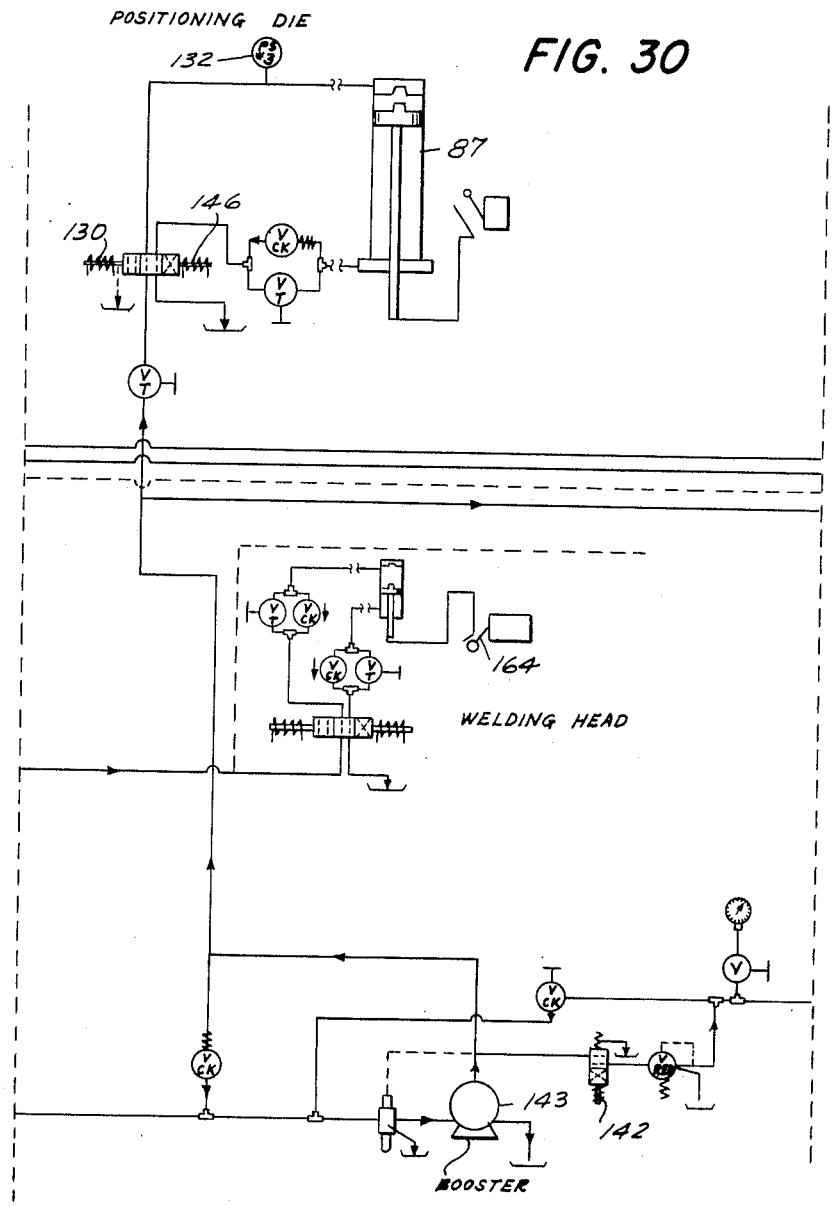
Figure 36:
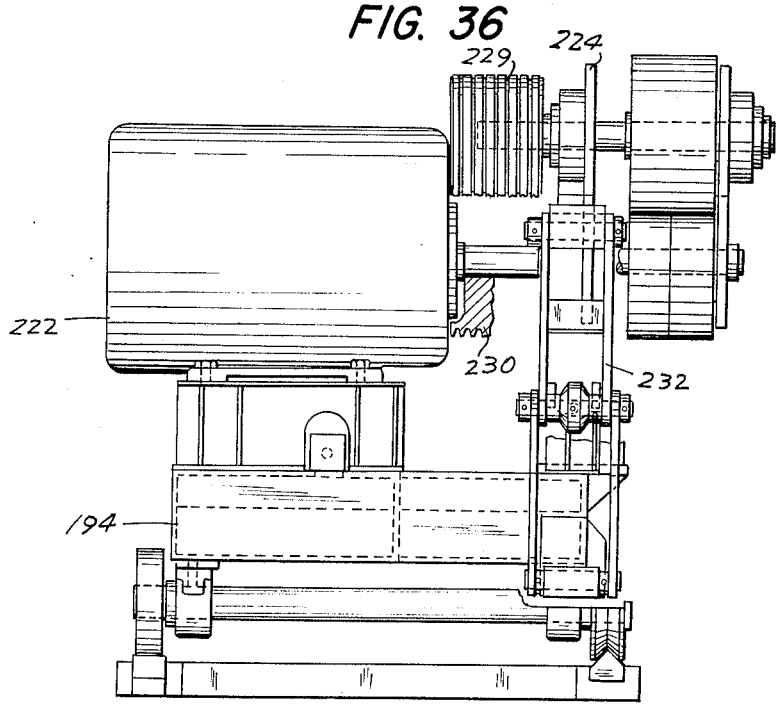
Figure 37:
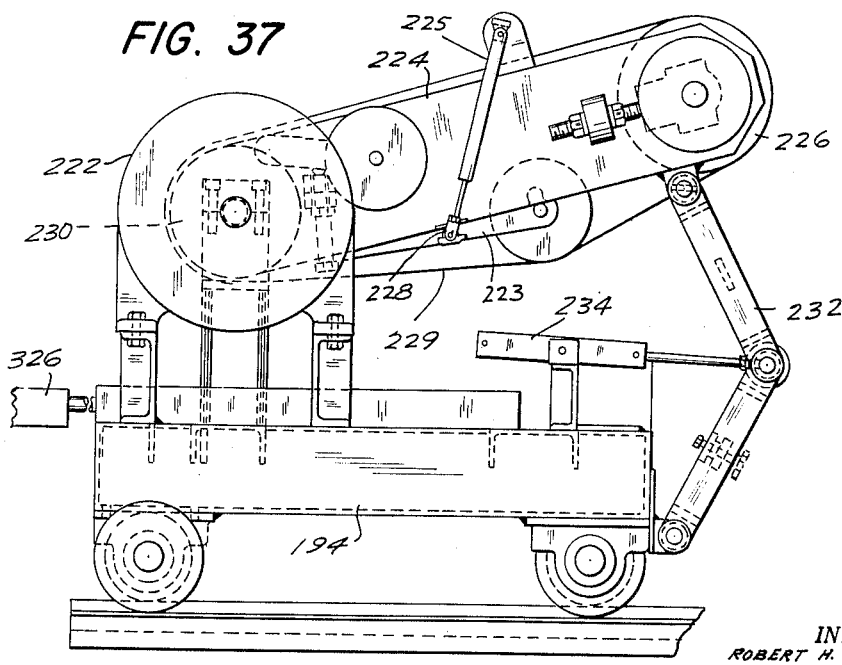
Figure 38:
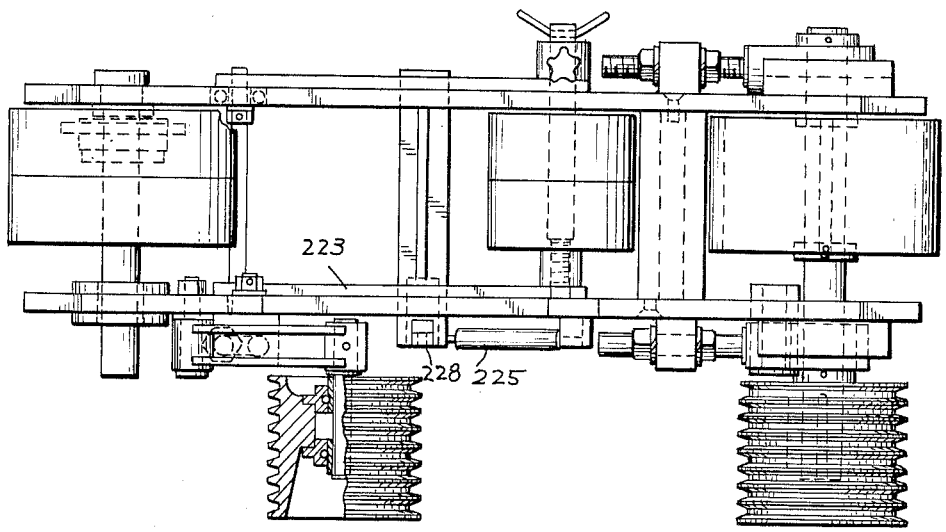
Figure 39:
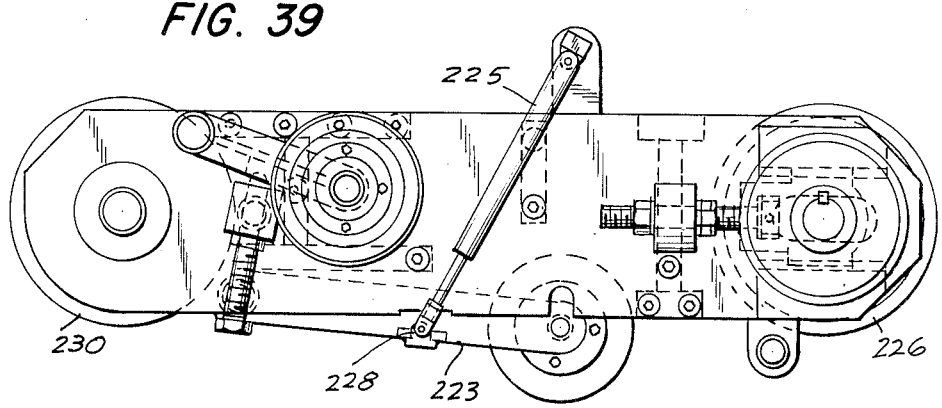
Figure 40:
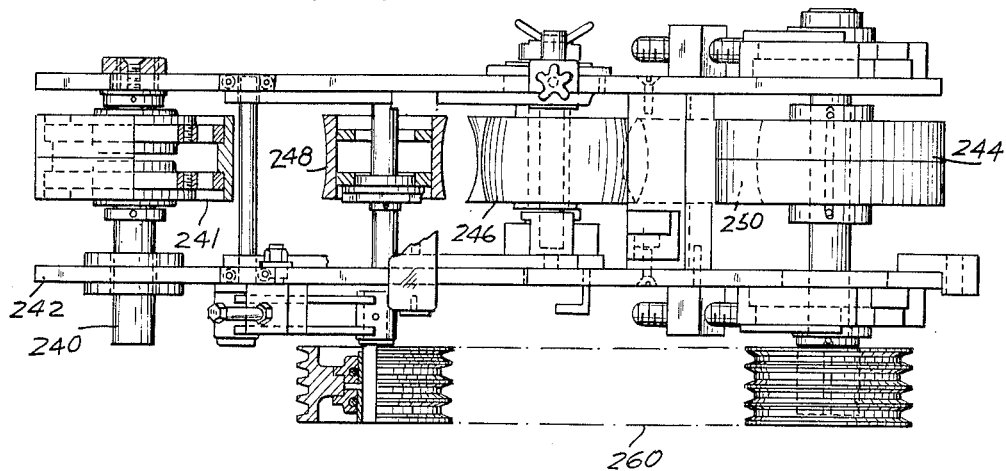
Figure 41:
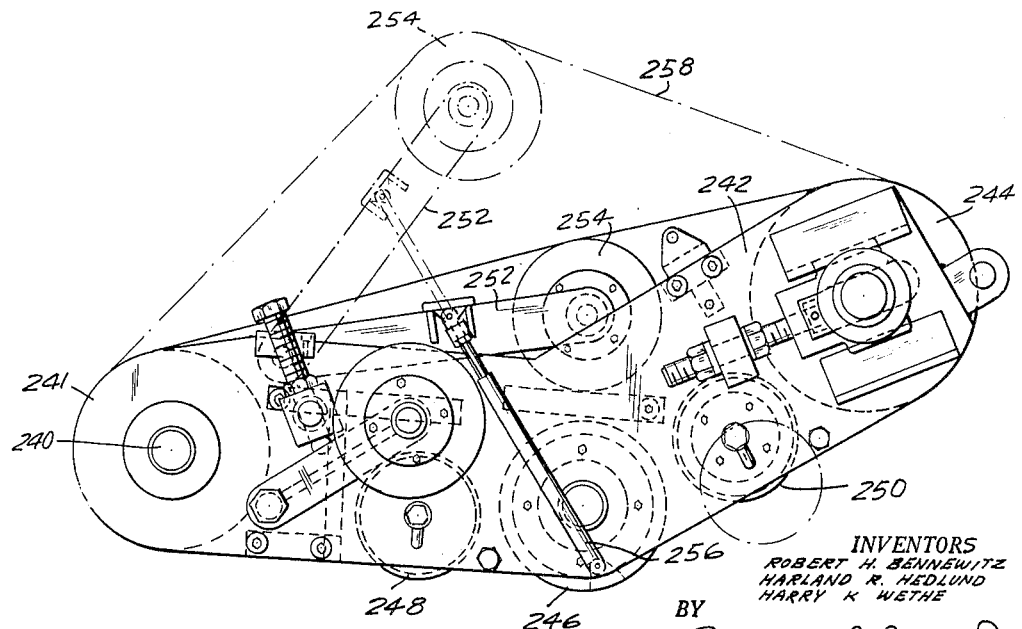
Figure 45:
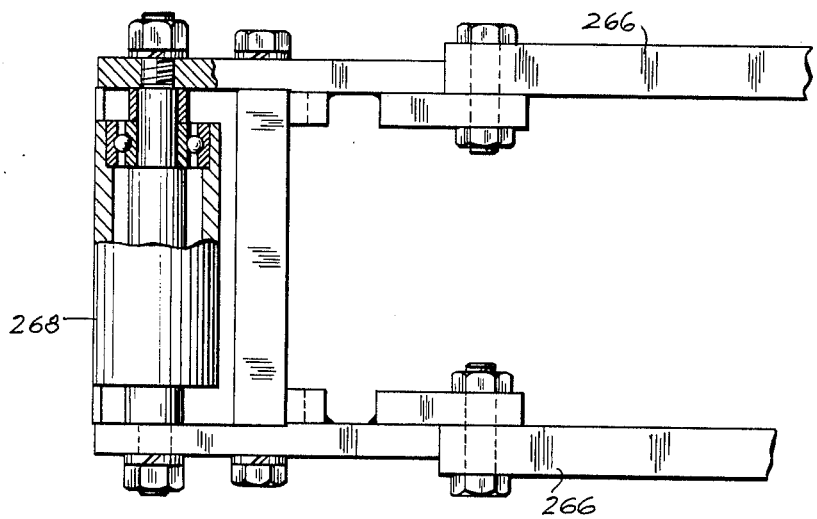
Figure 46:
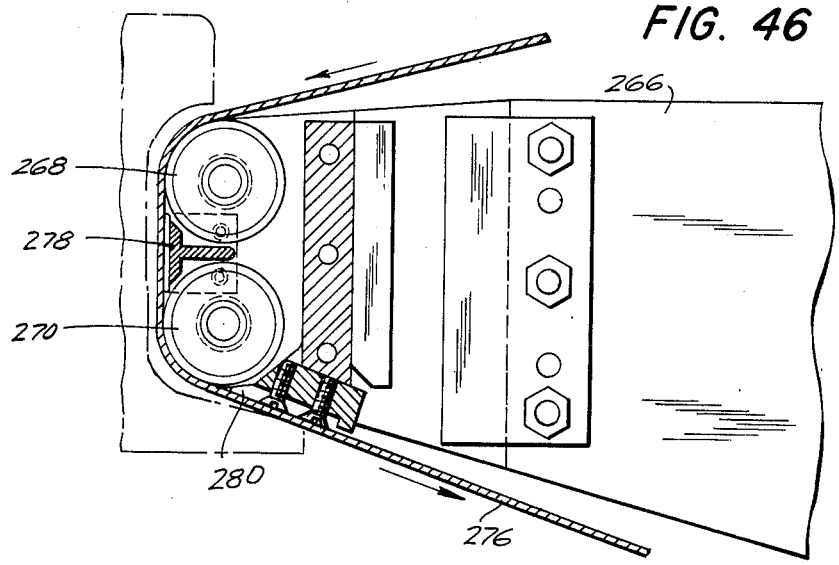
Figure 49:
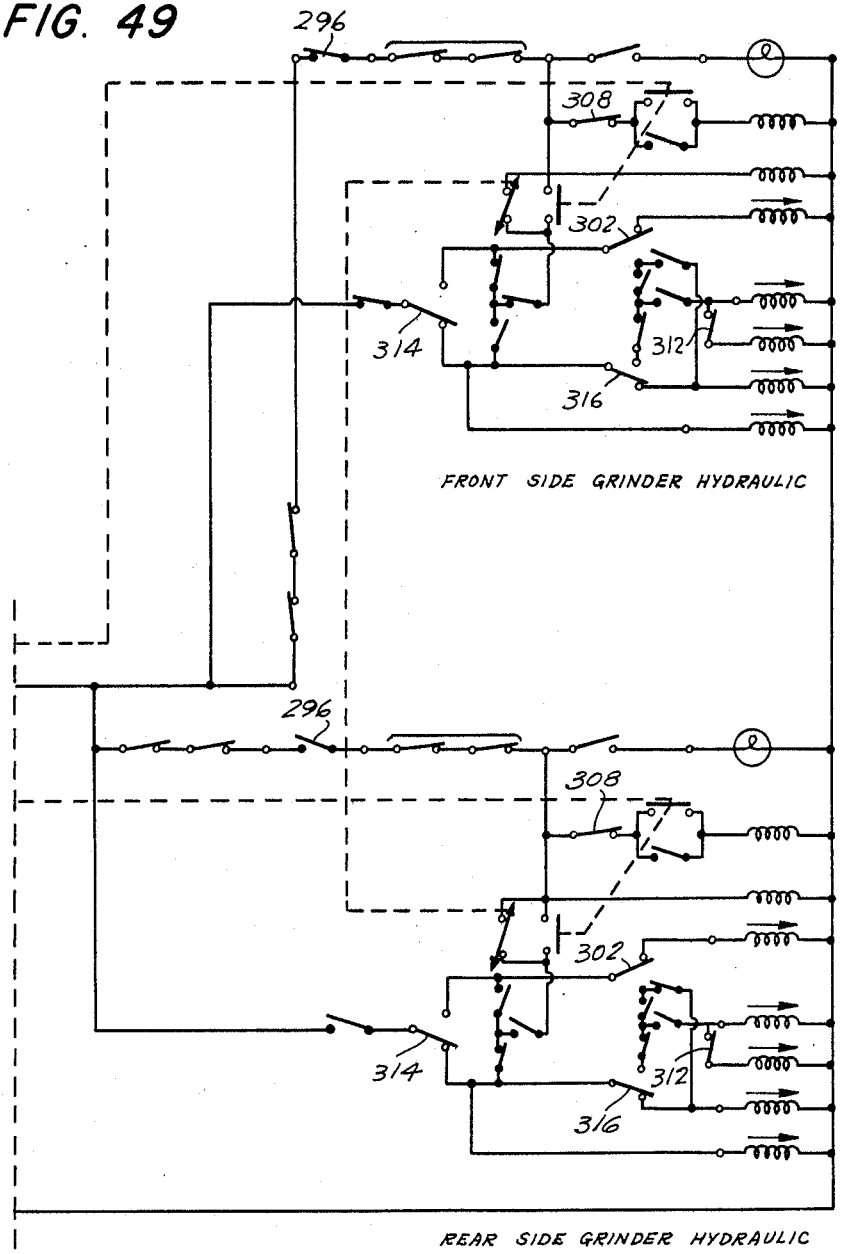
Figure 50:
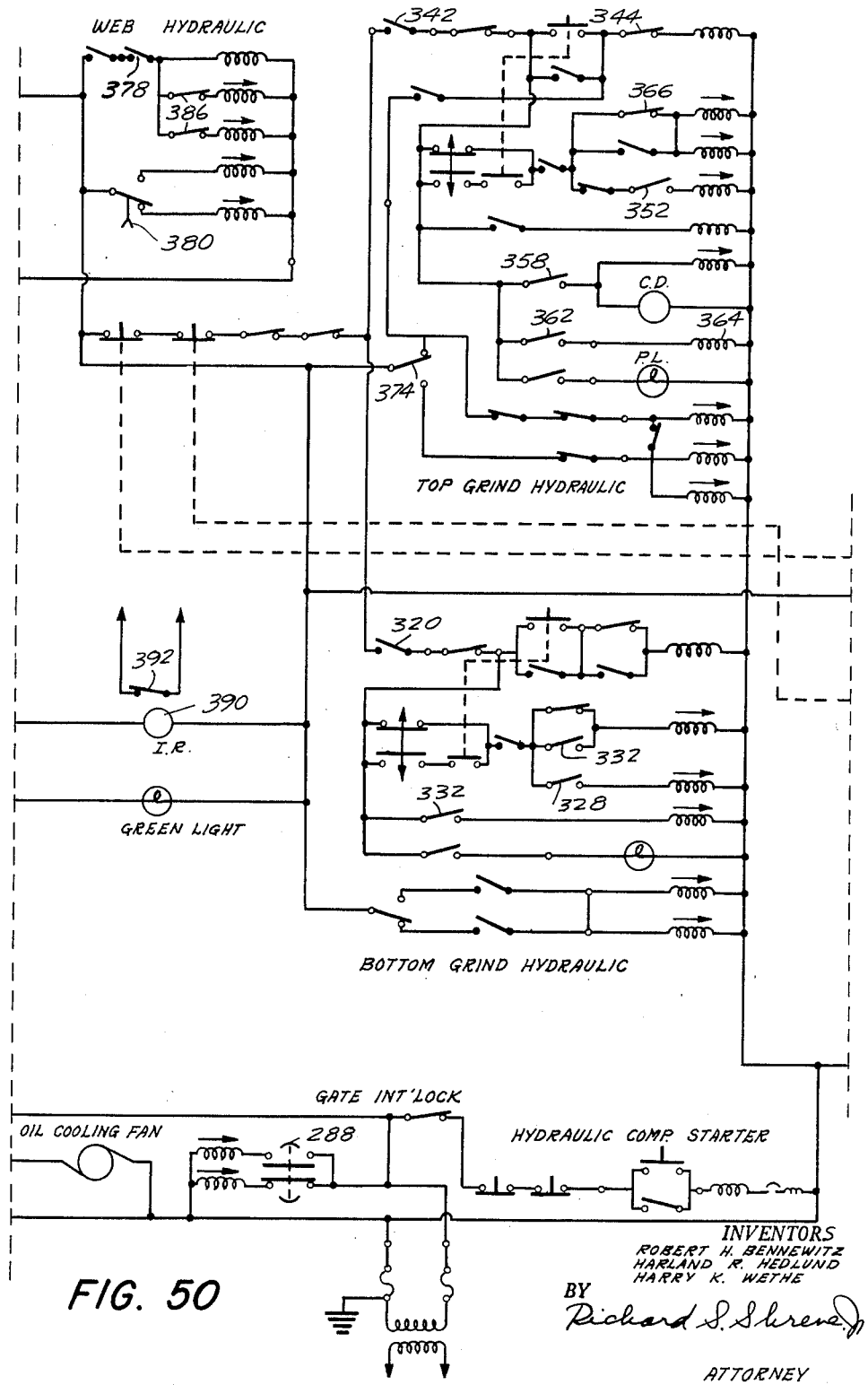
Figure 51:
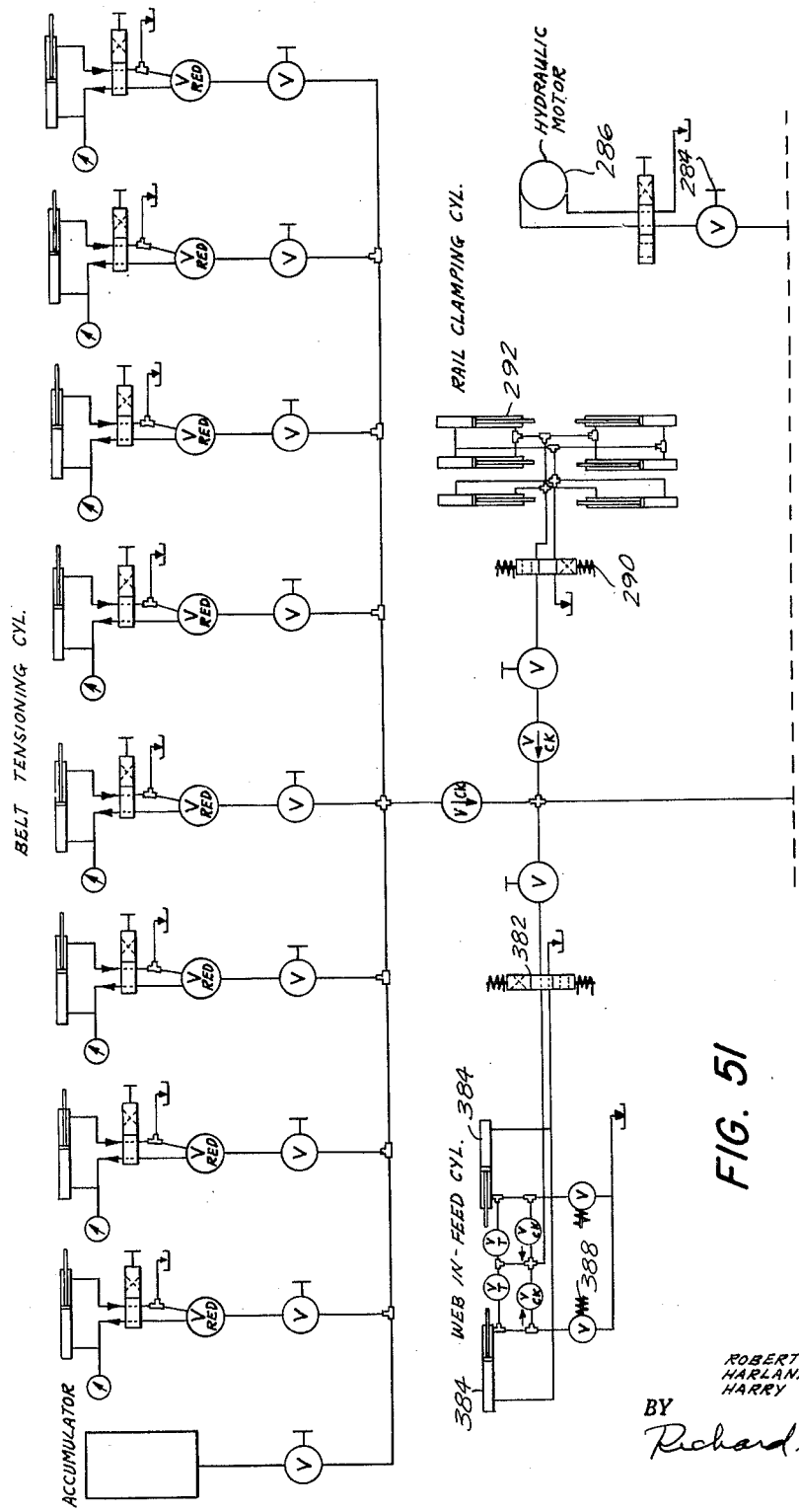

In the drawings:
FIGS. 1 and 2 in succession form a plan of the production line of the system;
FIG. 3 is a perspective view of the rail feeding shuttle;
FIG. 4 is an electric diagram for the same;
FIG. 5 is a motion diagram for the same;
FIG. 6 is a vertical section through the shuttle saddle lift;
FIG. 7 is a plan of the end finishing machine;
FIG. 8 is a side elevation of the same;
FIG. 9 is an end elevation of the same;
FIG. 10 is a section along line 10—10 of FIG. 7;
FIG. 11 is a pneumatic diagram for the machine of FIG. 7;
FIG. 12 is a perspective view of the power roll;
FIG. 13 is a perspective view of the lifter roll;
FIG. 14 is a perspective view of the power pinch roll;
FIG. 15 is a perspective view of the side guide rolls;
FIG. 16 is a side elevation of the welding machine;
FIG. 17 is an incoming end elevation of the same;
FIG. 18 is an outgoing end elevation of the same;
FIG. 19 is a transverse section along the line 19—19 of FIG. 16;
FIG. 20 is an inverted plan of the upper aligning die;
FIG. 21 is a plan of the lower aligning die;
FIG. 22 shows the alignment dies in closed position;
FIG. 23 is a section taken along line 23—23 of FIG. 16 showing the outgoing gag clamp;
FIG. 24 is a section along line 24—24 of FIG. 23;
FIG. 25 is a section along line 25—25 of FIG. 16, showing the incoming gag clamp;
FIGS. 26, 27 and 28 are electric diagrams of the welding station;
FIGS. 29, 30 and 31 are fluid pressure diagrams of the welding station;
FIG. 32 is a side elevation of the grinder station;
FIG. 33 is a schematic plan of the same;
FIG. 34 is a plan of a side grinder;
FIG. 35 is a side elevation of the same;
FIG. 36 is an end elevation of the bottom grinder;
FIG. 37 is a side elevation of the same;
FIG. 38 is plan of the same;
FIG. 39 is a side elevation of the bottom grinder frame;
FIG. 40 is a plan of the top grinder;
FIG. 41 is a side elevation of the same;
FIG. 42 is a side elevation of a web grinder;
FIG. 43 is a rear end elevation of the same;
FIG. 44 is a front end elevation of the same;
FIG. 45 is an enlarged plan of the head of the web grinder;
FIG. 46 is an enlarged side elevation of the same;
FIG. 47 is a motion diagram for the welding station;
FIGS. 48, 49 and 50 are electric diagrams for the same; and
FIGS. 51 and 52 are fluid pressure diagrams for the same.

As shown in FIGURES 1 and 2, at the feeding station A the incoming rails are fed in succession to the production line which leads to the end finisher station B, where the ends of the rail lengths are ground off square in preparation for welding.

From the finisher station B the ground rails pass along the production line to the welding station C, where the so finished ends are welded together. When the weld is completed, the ribbon thus produced is advanced along the production line to bring the weld to the weld grinder station D, where the weld upset is ground off of the ribbon rail joint.

At the feeding station A, the incoming rail lengths L are unloaded by a crane onto a rack K at one side of the production line, from which they are fed in succession by a self propelled shuttle carriage R having an elevator which rises under and lifts the first rail from the rack. The car then returns to transfer the rail onto the line where the elevator lowers the rail onto power rolls P and idler support rolls I of the production line.

The power rolls advance the rail over a lifter roll E on to a stop at the end finisher station B, where a belt grinder J is moved bodily across the stopped oncoming end of the rail. The power rolls then advance the rail length, and a return pass of the belt grinder J squares the trailing end of the rail. The operator indicated at M by means of controls N at the end finisher station B controls all of the movement of the rail at feeding station A up to and through the end grinder station B.

From the end finisher station B the rail is advanced to an optional cleaning and deburring station (not shown) on to the welding station C where the ground ends of the rail section are abutted, aligned, pressurized, and oxy-fuel pressure welded. The welded rail thus produced passes on over idler rolls I and power pinch rolls W under the control of an operator indicated at S by means for controls Q for the entire subsequent length of welded rail produced.

From the welding station C the ribbon rail passes to the weld upset reducing station D where the weld upset portions on the upper and lower sides, flat bottom, round top, and both sides of the web are reduced by rolling or grinding. Inasmuch as the advance of the welded rail is controlled by the weld operator S, the grinding belts at the station D are mounted on a wheeled car or truck T containing inner carriages so that the belts thereon can be moved in succession into engagement with respective portions of the weld upset to be ground. The movement of the truck T and its carriages are controlled by an operator indicated at Z.

The weld ground rail is passed from the grinder station D to an optional normalizing station (not shown) where the weld is heated to 1550° F. and then cooled. From the normalizing station the welded rail advances to an inspection station and then onto a train of coupled flat cars for shipment to the field. Welding two 39 ft. lengths form a 78 ft. welded rail, and so on up to a quarter mile integral length.

The transfer shuttle carriage R of station A is shown in FIGURE 3 and comprises a wheeled truck mounted on a cross track 10 transverse to the production line, along which track the carriage is propelled by a reversible motor 12.

As shown in FIG. 6, the truck R carries a pair of upright sleeves 13 in each of which is rotatably and slidably mounted a hollow screw 14 threaded into a fixed nut 15 above the top of the sleeve. A shaft 16 secured in the top of the screw 14 is journaled in a bearing 17 in the bottom of the rail cradle 18. The screw 14 is rotated by a spline shaft 19 journaled in a bearing 20 at the bottom of the sleeve 14, and driven through sprocket drive 21 from elevator motor 22.

In operation, when the empty shuttle R approaches the rack K, as shown in FIGURES 4 and 5, a limit switch 23 ahead of the cradle 18 is engaged by the rail and actuated, which de-energizes the motor 12 to dissipate the momentum of the shuttle R and starts the time delay 24. The time delay 24 overrides the limit switch 23, and re-energizes the motor 12 to move the shuttle R forward at substantially lower speed. This brings limit switch 25 on the shuttle R behind the cradle 18 into engagement with the rail, which de-energizes the motor 12, stops the shuttle and energizes the motor 22 to raise the cradle 22.

The limit switch 26 is actuated by the rail and the motor 22 continues to raise the cradle 22 until limit switch 27 is actuated. Limit switch 27 de-energizes the motor 22, stops the raising of cradle 18, and reversely energizes the motor 12 to carry the rail to the production line. The rail carrying continues until limit switch 28 intercepts the cam at the centerline of the production line.

The limit switch 28 de-energizes the reverse motor 12 and starts the time delay 29 to absorb the momentum of the shuttle preparatory to having it move into the production line. The time delay 29 re-energizes the reverse motor 12 to move the shuttle rearward unless a rail is already in place in the production line, holding limit switch 30 to de-energize time delay 29. If no rail is there, the shuttle continues to actuate time delay 29 to energize motor 12. Limit switch 31 de-energizes reverse motor 12 and stops the shuttle, and reverses motor 22 to lower the cradle and its rail onto the power rolls P and idler rolls I of the production line. At this point limit switch 32 energizes the motor 12 to start the shuttle toward the rack R to repeat the cycle.

The power roll P in the production line onto which the shuttle lowers the rail is shown in FIG. 12 is comprising a frame 34 carrying a motor 35, which through sprocket chain drive 36 drives a roller 37 journaled in the frame 12 and having adjustable flanges 38.

The lifter roll E over which the rail is passed by the power roll D is shown in FIG. 13 as comprising a frame 40 having pivoted thereon a table 41 on which is journaled a roller 42 having adjustable flanges 43. A cylinder 44 tilts the table 41 about its pivot to raise or lower the roller 42.

The machine at the finishing station B is shown in FIGS. 7 and 8 as comprising a rigid stationary main frame having incoming table 46 and outgoing table 47 to receive the rail, and cross tracks 48 on which roll the wheels of a cross carriage 49, driven by a cylinder 50. The main frame also has stationary side jaws of rail clamps 51 and 52, the movable jaws which are actuated by cylinders 53 and 54. Movable upper rail clamp jaws 55 and 56 actuated by cylinders 57 and 58 hold the rail on the tables 46 and 47.

The cross carriage 49 has mounted thereon a motor 33 driving the shafts of a pair of longitudinally tandem rolls 59 and 60. An idler roll 61 is journaled in a yoke pivoted on the carriage 59 for movement in response to a pressurizing cylinder on the same carriage. The endless abrasive belt J passes over the tandem rolls 59 and 60 and the idler roll 61.

A longitudinally adjustable carriage mounted on the cross carriage 49 has rigidly mounted thereon rail stops 63 and 64 for the depth of cut by the belt on rolls 59 and 60 respectively. This carriage is adjusted by positioning cylinder 65.

In operation, the lifter rolls E are raised to elevate the trailing end of the rail to compensate for camber therein, and the power rolls are energized to propel the rail on to the table 46 and against the stop 63. The side clamp cylinder 53 is actuated to clamp the side of the rail, and the top clamp cylinder 57 is actuated to hold down the rail. The belt drive motor 58 is started, and the cross cylinder 50 actuated to move the cross-carriage 49. This moves the rail stop 63 out of the way and brings the belt on roll 59 into engagement with the rail end and continue thereon to grind true.

The clamp cylinders 53 and 57 are released, and the power rolls actuated to move the rail on over outgoing table 47 through the machine past the belt. The cross cylinder 50 is then reversely actuated to bring the rail stop 64 into the path of the rail. The power rolls are then reversed to bring the railing rail end into engagement with the stop 64. The trailing end clamp cylinders 54 and 58 are actuated to grip the trailing end of the rail. Further action of the cylinder 50 carries the belt on roll 60 across the rail end to true it.

The pressure welding machine at the welding station C comprises a welded water-cooled supporting frame constructed principally of square heavy wall tubing. The top member is a heavy wall pipe 66, which serves as a track for two trolleys 67 and 68, from which are suspended the clamping assemblies for the rail ends.

Each of the trolleys has a pair of journals 70 for co-acting geared lever jaws 72 of rail web clamps. The clamp on the trolley 68 engages the web of the finished ribbon rail end and is actuated by rods 73 connecting the lever ends of jaw 72 to a yoke 74, secured by rods 75 to the casings of hydraulic cylinders 76 fixed permanently to the main frame. The piston rods 78 of these cylinders are connected to the lever ends 72 of a trolley 67 rail web clamp.

Mounted in the center of the frame are a pair of angularly disposed guide frames 80 preferably 45° to the horizontal as shown in FIG. 19, provided with rolls 82 which engage the outer sides of tie rods 84. The rods 84 are secured at the bottom to a cradle 86 for a lower alignment die 88. The tops of the rods 84 are secured to a yoke 85 rigid with the casing of a cylinder 87. The piston rod 90 is secured to a carriage 91 for the upper aligning die 89 which carriage has rolls engaging the inner sides of the rods 84.

Mounted ahead of the alignment mechanism inside the frame 80 is a gag clamp frame 92 as shown in FIG. 23, in which are slidably mounted an upper gag clamp 93 and a lower gag clamp 94, operated by cylinders 95 and 96, respectively. The upper clamp has top contact 97, ball side contact 98, and flange edge contact 99. The lower gag clamp has a ball side contact 100, and bottom contact 102.

Mounted beyond the alignment mechanism inside the frame 80 is a gag roller frame 104 as shown in FIG. 25. The construction and operation is identical with that shown in FIG. 23, with the exception that the contacts 97, 98, 99, 100 and 102, are replaced by rollers 69, 71, 77, 79 and 81.

The welding blowpipes are mounted between the frames 92 and 104. As shown in FIG. 16, a longitudinal push rod 105 is mounted on roller 106 on the frame and oscillated by a pitman 107 driven by a motor 109. The rod 105 carries a yoke 110 in which is pivoted an arm 112 as shown in FIG. 19. Mounted on the arm 112 are blowpipes having a top head 113 and a side head 114. The bottom of the arm 112 is connected to a cross rod 115 actuated by a cylinder 116, for swinging the arms 112 and its blowpipes about its pivot on the yoke 110.

The rod 115 is slotted to move relative to a fixed pivot 119 for a cam 117 actuated by a link 118, secured to the rod 115 near the cylinder 116. The cam 117 has blowpipes rigidly secured thereto carrying a side head 120 and a bottom head 122, which swing out about the pivot 119 when the cylinder 116 is actuated at the completion of the weld.

In the operation of the welding station C as shown in FIG. 26, the operator pushes clamp button 125 which locks in control relay 126 and energizes solenoid valve 127 which supplies oil pressure to the head ends of endo cylinders 76. When the desired low pressure is reached, pressure switch 128 closes, which energizes control relay 129. Relay 129 energizes solenoid valve 130, which supplies oil to the gag cylinders 95 and 96.

When the pressure in the gag cylinders reaches the pre-set value, pressure switch 137 closes, energizing control relay 138, which energizes solenoid valve 135 to open hydraulic pressure to positioning die cylinder 87.

When the pressure in positioning cylinder 87 reaches a predetermined value, pressure switch 132 energizes control relay 134, and also energizes solenoid valve 139 which closes check valves 140 and locks the gag clamps in position.

Control relay 134 also energizes solenoid 142, which supplies high endo pressure from booster 143 to the cylinder 76. The high pressure closes pressure switch 144, picking up control relay 145, which de-energizes solenoid 139 to cut off the pressure to the head end of cylinder 87, and energizes solenoid 146 to supply oil pressure to the rod end of cylinder 87, thus retracting the positioning dies clear from the rail.

When the positioning dies have retracted, limit switch 150 is tripped by the piston of cylinder 87, and closes the circuit for operation by the weld button 152. Up to this point the entire sequence has been automatic, and now the welding operation proper begins.

Weld button 152 locks control relay 153, which energizes solenoid 154. Solenoid 154 supplies oil pressure to cylinder 116 to bring the welding heads into welding position. Control relay 153 also energizes solenoid 158, which supplies oil from the upset measuring system cylinder 160 to the magnifying cylinder 162.

When the welder heads are in, they close limit switch 164, which energizes control relay 166 to set up the system for heating and oscillating.

The operator presses start button 170, locking starting relay 172, and energizing acetylene timer 174 and oxygen timer 176, which opens valves to the head which are subsequently ignited by a pilot flame. The operator then presses the oscillator button 173 which energizes the motor 109.

At this point, the rail joint is being heated. As the rail ends begin to upset, the endo clamps move together. The piston of measuring cylinder 160 is moved a distance equal to the amount of upset predetermined. The hydraulic fluid displaced from the rod end of cylinder 160 is forced into the magnifying cylinder 162. The piston of cylinder 162 trips the limit switch 178. This stops the upsetting by de-energizing the endo pressure system.

Limit switch 128 locks in control relay 180, opens control relay 153, de-energizing solenoids 154 and 158. Control relay 166 opens, shutting down all welding flames, shuts down all welding heads, shuts off the oscillator motor 109, and simultaneously control relay closes the endo high pressure valve, cutting off the high pressure.

The machine off button 182 drops out control relay 126, which de-energizes the entire electrical control of the machine.

The power pinch rolls W by which the welded rail leaving the welding station C is propelled along the production line through grinding station D are shown in FIG. 14 as comprising a frame 173 supporting a drive motor 175. The motor 175 has a reduction gear 177 driving through chain drive 179 a knurled roller 181 journaled in the frame 173. Slidable in the frame 173 above the knurled roller 181 are journals for a pressure roller 183 urged toward the knurled roller 181 by a heavy coil sping 185 adjustable by a screw 187.

At the weld grinding station D, the machine comprises a wheeled vehicle frame 190 as shown in FIG. 32 on the floor of which are a pair of side grinder carriages 192 and a bottom grinder carriage 194 in tandem therewith. Suspended from the top of the frame 190 is a top grinder carriage 196, and at an intermediate height are a pair of transverse opposed web grinder carriages 198.

The side grinder carriages each carry an upstanding axle 200 on which are journaled an upper ball grinding belt frame 202 and a lower flange grinding belt frame 204. As shown in FIG. 34 each of these frames has an axle for a belt backing pulley 206, and a yoke 205 for a tightener 208 actuated by a cylinder 209. An idler 210 is journalled on the shaft 200. The backing pulley 206 is driven by a pulley 212 on its axle, belted over an idler 214 and a motor driven pulley 216.

The frames 202 are aligned in transversely opposed relation in operating position, and the frames 204 are at an adjusted trailing angle of about 15° thereto, so that the ball grinder belt 218 on the frame 202 operates before the flange grinder belt on the frame 204.

The bottom grinder carriage 194 supports a motor 222, concentric with the shaft of which is journaled a belt frame 224 having axles for a backing pulley 226 and a yoke 223 for a tensioner 228, actuated by a cylinder 225.

A bottom grinder belt 229 passes over these pulleys and the motor drive pulley 230. The frame 224 is raised into position by a toggle 232 actuated by a cylinder 234.

The top grinder carriage 196 has a transverse axle 240 on which is journaled an idler roller 241 and a top grinder belt frame 242. This frame has an adjustable axle for a drive roll 244, and axles for a concave bearing roller 246, a concave lead in roller 248 thereto, and a concave lead out roller 250 therefrom. A yoke 252 on the frame 242 journals a tension roller 254 actuated by a cylinder 256. The top grinder belt 258 passes over these rollers and is driven by the roller 244 in turn driven by belt 260.

Each web grinder carriage 198 as shown in FIG. 42 supports a motor 262 having a drive pulley 264, and an adjustable frame 266 in which are journaled top and bottom web grinding backing rollers 268 and 270, and a yoke 272 journaling a tensioning roller 274. The web grinding belt 276 passes over these rollers.

As shown in FIG. 46, a platen 278 engages the bight of the belt between the grinding rollers, and a lead off platen 280 engages the belt leaving the lower roller and engaging the top of the rail flange.

In operation of the weld grinding machine, the frame 190 is adjusted to bring the pointer 282 to register with the weld in the ribbon. This is done as shown in FIG. 51, by the throttle valve 284 controlling the hydraulic motor 286 which drives the vehicle. To clamp the vehicle to the rail, manually operated switch 288 (FIG. 50) is closed, which energizes solenoid valve 290 (FIG. 51) which supplies oil to the rail clamping cylinders 292.

The operator now closes starter switches 294 (FIG. 48) which start the motors for the side grinder belts 218 and 220. Then the starting switches 296 (FIG. 49) are closed, which energizes the electrical circuit to solenoid valves 298 (FIG. 52) which supply oil to the side feed cylinders 300 to move the side grinder carriages 192 forward. After the carriages have passed the weld, limit switches 302 are tripped to energize solenoid valve 309 (FIG. 52) to load the in-positioning cylinders 306, which move the belts in toward the rail. Simultaneously, limit switches 308 (FIG. 49) are tripped, which de-energizes valves 304 and lock the cylinders 306. Limit switches 302 actuate valve 310, which start the slow retract of the carriages 192 to make the grinding cut.

When the side grinding cut is completed, limit switches 312 (FIG. 49) are tripped to de-energize throttle valve 310, and limit switch 314 is tripped, which reverses valves 304 to swing out the side grinding units. Limit switch 316 de-energizes cylinders 306.

The bottom grinding is started by a push button 318 (FIG. 48) which starts the bottom grinding belt motor 222. The control circuit (FIG. 50) is energized by push bottom 320 which actuates solenoid valve 324 (FIG. 52) to feed roll to cylinder 326 which moves the bottom grinding carriage longitudinally toward the weld. Limit switch 328 is tripped which energizes solenoid valve 330 to supply oil to cylinder 234 (FIG. 37) and raise the frame 224. Limit switches 332 energize solenoid valves 336 to start the slow motion of the carriage for the bottom grinding cut.

The top grinder is started by push button 340 which closes contacts 342 (FIG. 50). The push button 344 starts the automatic sequence, starting the motor 346 for the grinder drive belt 260, and also engages solenoid valve 348 (FIG. 52) which supplies oil to cylinder 350 for propelling the carriage 196 forward along the rail toward the weld. Short of the weld, limit switch 352 (FIG. 50) is closed to actuate solenoid valve 354 (FIG. 52) which supplies oil to cylinder 356 to lower the frame 242 to bring the grinding belt 258 on the backing roll 246, to a point slightly higher than the weld upset. At this point, limit switch 358 (FIG. 50) is tripped, to energize valve 360 which provides a slow speed forward to complete the first stroke.

At the completion of the first stroke, limit switch 362 (FIG. 50) is tripped which initiates the counting device 364 and simultaneously actuates valve 348 for the return stroke, limit switch 366 being closed to control the depth of cut by means of the double hydraulic cylinder 368, the counting device causing a short stroke reciprocation, limited by the gauge 370 to determine the depth of cut.

With each forward and return motion of the carriage 196, cylinder 368 bleeds off a small predetermined amount of hydraulic fluid from cylinder 356, the direction being controlled by valve 372, the amount being controlled by the gauge 370, which allows the grinder to drop in small preset increments between each stroke of the cylinder 350. When the correct number of counts have been made by counting device 364, and the predetermined corresponding cutting strokes have been made, limit switch 374 is operated to actuate cylinder 356 to lift the grinder belt, and to actuate cylinder 350 to return the carriage.

When the top grind is completed, switch 288 is manually opened to release the rail clamp, and valve 284 (FIG. 51) is manually operated to supply oil to the motor 286 to reposition the vehicle so that the web grinders are brought into register with the weld, and switch 288 closed to clamp the vehicle to the rail in the new or web grinding position. Push button 376 closes the contacts 378 which start the motors 262 for the belt drive, and simultaneously closes switch 380 which energizes valve 382 which supplies oil to the web in feed cylinders 384. Limit switches 386 energize valves 388 which retard the inward advance of the carriages 198, and switch 380 is tripped to limit the advance, and the carriage 198 retracted.

It should be noted that whenever any of the starter buttons 318, 340 or 294 are pushed, coil 390 (FIG. 50) is energized, which opens the normally closed switch 392 to de-energize all of the power feed rolls W so that the welded rail cannot be moved.

What is claimed is:

1. Method of production of pressure butt welded railroad rail, which comprises feeding the oncoming rails in succession into a production line where the front end of each is pressure butt welded to the rear end of the rail in front of it, said line containing an end finisher station, advancing said rails in succession along said production line, stopping each rail with the leading end thereof in said end finisher station where the ends of the rail are prepared for welding and the trailing end of each rail is brought into a preselected position, and raising the so positioned trailing end of said rail to compensate for camber therein.

2. Method of production of pressure butt welded railroad rail, which comprises feeding oncoming rails in succession into a production line where the front end of each is pressure butt welded to the rear end of the rail in front of it, advancing said rails in succession along said production line, stopping each rail with the leading end thereof in an end finisher station where the ends of the rail are prepared for welding and the trailing end of each rail is brought into a preselected position, raising such trailing end of said rail to compensate for camber therein, and moving a grinder transversely to said production line at said end finisher station to grind off the leading end of said rail.

3. Method of production of pressure butt welded railroad rails, which comprises advancing end finished rails in succession to a welding station, pressure butt welding together such rail ends at said station, advancing the so-welded rails to bring the weld joint to a grinding station, grinding off upset metal at the so-welded joint by first bringing ball and flange side grinder belts respectively toward each other into contact with the rail, and moving said side grinder belts toward and beyond the weld joint, then retracting said side grinder belts, and lowering a concave rollered top grinder belt and raising a bottom grinder belt toward each other into contact with the rail, then moving said top and bottom grinder belts toward and beyond the weld joint, and repeating the pass of said concave rollered top grinder belt while the bottom grinder belt remains stationary, finally retracting said top and bottom grinder belts, and advancing web grinding belts transversely toward each other into grinding contact with the weld joint.

References Cited by the Examiner

UNITED STATES PATENTS

| | | | |
|---|---|---|---|
| 731,100 | 6/03 | Dick | 29—482 |
| 1,765,368 | 6/30 | Frahm et al. | 29—482 |
| 1,958,103 | 5/34 | Kelley | 29—481 X |
| 2,054,819 | 9/36 | Hudson | 29—33.2 |
| 2,120,316 | 6/38 | Stone | 29—33 |
| 2,181,502 | 11/39 | Biggert | 219—100 |
| 2,196,600 | 4/40 | Wean et al. | 29—33.2 X |
| 2,231,014 | 2/41 | Lytle et al. | 29—481 X |
| 2,320,638 | 6/43 | Morris | 51—139 |
| 2,320,639 | 6/43 | Morris | 51—139 |
| 2,403,229 | 7/46 | Murray et al. | 29—481 |
| 2,421,070 | 5/47 | Kerns | 78—82 |
| 2,533,605 | 12/50 | Mueller | 78—82 |
| 2,640,578 | 6/53 | Schroenghamer | 198—20 |
| 2,678,715 | 5/54 | Boehm | 198—20 |
| 2,714,787 | 8/55 | Orr | 51—142 |
| 2,747,342 | 5/56 | Ritter | 51—142 |
| 2,787,698 | 4/57 | Schlatter et al. | |
| 2,911,516 | 11/59 | Cox. | |
| 3,102,189 | 8/63 | Jones et al. | 219—82 |

JOHN F. CAMPBELL, *Primary Examiner.*

WHITMORE A. WILTZ, *Examiner.*